US012482936B2

(12) United States Patent
Hwang

(10) Patent No.: US 12,482,936 B2
(45) Date of Patent: Nov. 25, 2025

(54) MULTI-BAND ANTENNA MODULE

(71) Applicant: AMOTECH CO., LTD., Incheon (KR)

(72) Inventor: Chul Hwang, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 127 days.

(21) Appl. No.: 18/701,227

(22) PCT Filed: Oct. 7, 2022

(86) PCT No.: PCT/KR2022/015202
§ 371 (c)(1),
(2) Date: Apr. 13, 2024

(87) PCT Pub. No.: WO2023/063665
PCT Pub. Date: Apr. 20, 2023

(65) Prior Publication Data

US 2024/0421479 A1 Dec. 19, 2024

(30) Foreign Application Priority Data

Oct. 14, 2021 (KR) ........................ 10-2021-0136211

(51) Int. Cl.
*H01Q 1/52* (2006.01)
*H01Q 5/307* (2015.01)
(Continued)

(52) U.S. Cl.
CPC ............. *H01Q 5/307* (2015.01); *H01Q 1/521* (2013.01); *H01Q 5/50* (2015.01); *H01Q 9/0414* (2013.01)

(58) Field of Classification Search
CPC .......... H01Q 5/307; H01Q 1/521; H01Q 5/50; H01Q 9/0414; H01Q 1/243; H01Q 1/38; H01Q 1/46; H01Q 21/28; H01Q 21/24
See application file for complete search history.

(56) References Cited

U.S. PATENT DOCUMENTS 7,773,040 B2 8/2010 Rao et al.
9,583,838 B2 * 2/2017 Zhu ...................... H01Q 1/2266
(Continued)

FOREIGN PATENT DOCUMENTS

KR 10-2012-0080929 A 7/2012
KR 10-1640709 B1 7/2016
KR 10-2021-0041366 A 4/2021

OTHER PUBLICATIONS

KR Decision to Grant Dated Dec. 26, 2023 as received in Application No. 10-2021-0136211.

*Primary Examiner* — Dameon E Levi
*Assistant Examiner* — Michael M Bouizza
(74) *Attorney, Agent, or Firm* — Maschoff Brennan

(57) ABSTRACT

Proposed is a multi-band antenna module in which antennas having different polarization characteristics are coupled so as to prevent deterioration in isolation caused by interference between the antennas. The proposed multi-band antenna module comprises a circuit board. On the top surface of the circuit board, a first upper clearance area, a second upper clearance area, an upper radiator, and an upper ground are defined so as to operate as a PIFA antenna resonating in a first frequency band. On the first upper clearance area and the second upper clearance area, a first conductor area and a second conductor area operating as a monopole antenna resonating in a second frequency band are defined.

17 Claims, 20 Drawing Sheets

(51) Int. Cl.
*H01Q 5/50* (2015.01)
*H01Q 9/04* (2006.01)

(56) References Cited

U.S. PATENT DOCUMENTS

| | | | | |
|---|---|---|---|---|
| 10,741,929 | B2 | 8/2020 | Toyao | |
| 2013/0115884 | A1* | 5/2013 | Zhang | H01Q 5/357<br>343/770 |
| 2015/0029068 | A1* | 1/2015 | Toyao | H01Q 5/385<br>343/770 |
| 2024/0097342 | A1* | 3/2024 | Morita | H01Q 21/24 |

* cited by examiner

[FIG. 1]
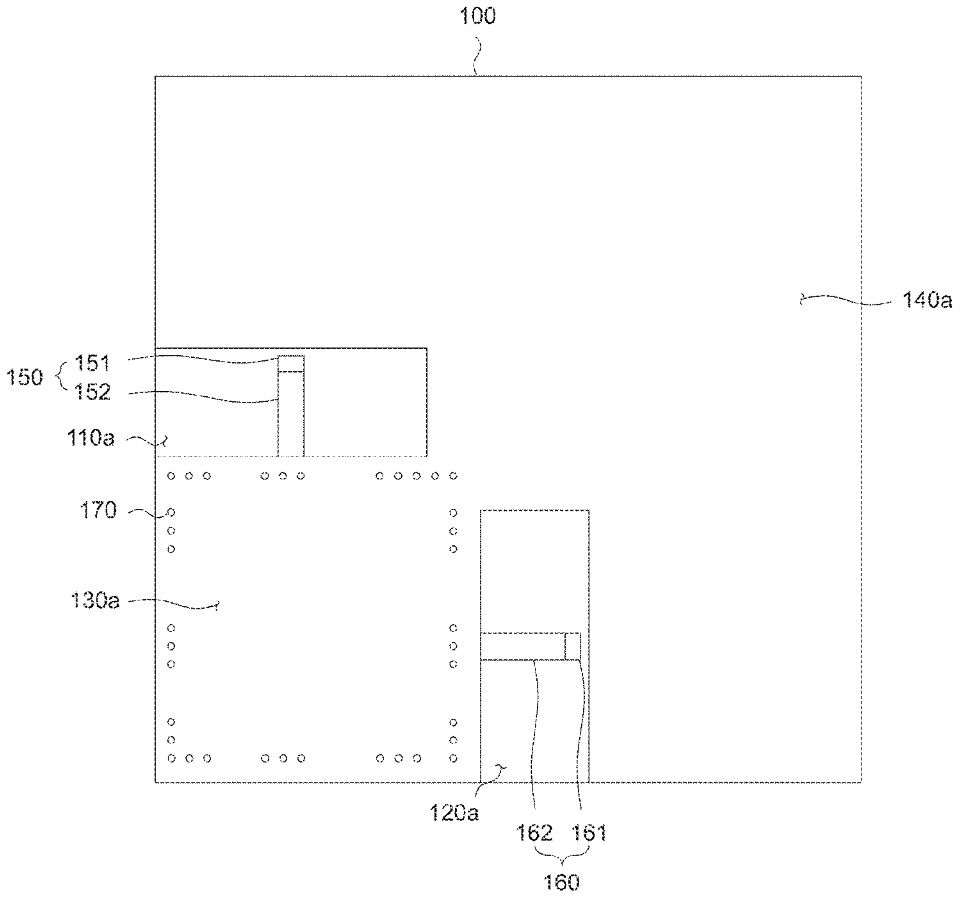

[FIG. 2]
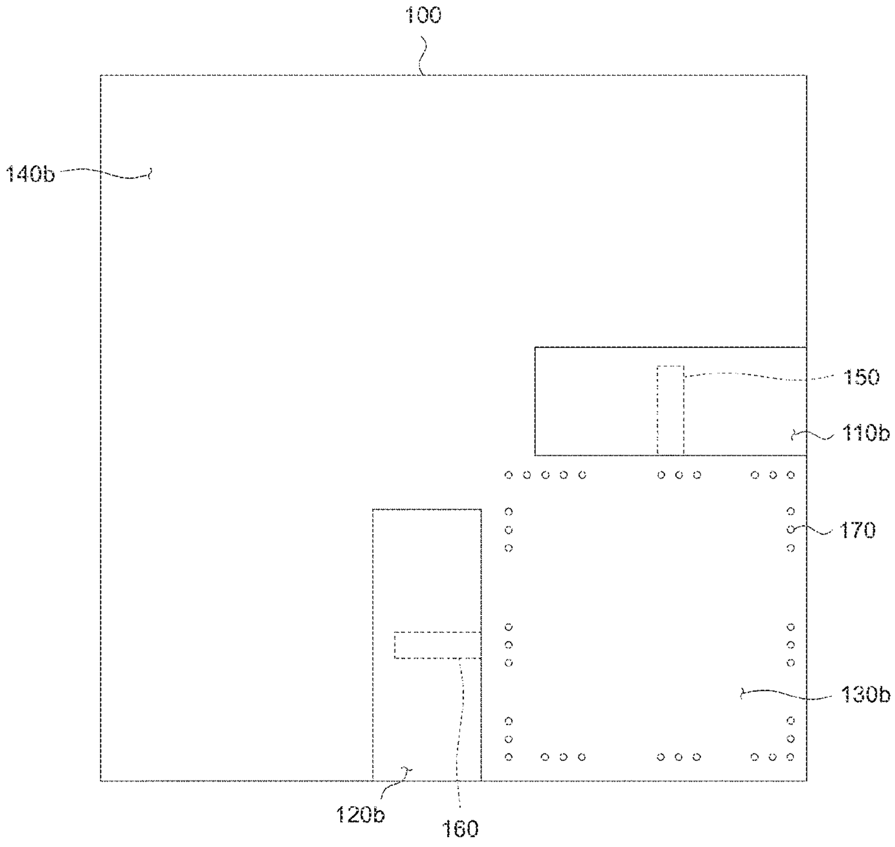

[FIG. 3]
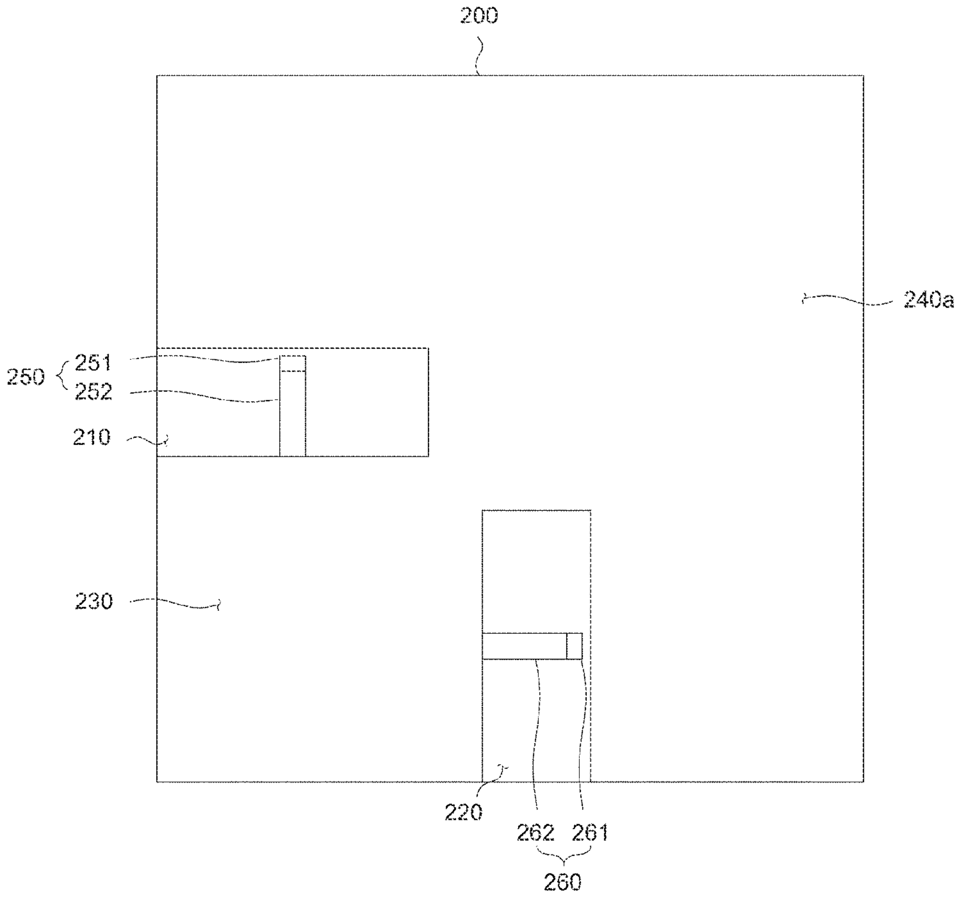

[FIG. 4]

[FIG. 5]
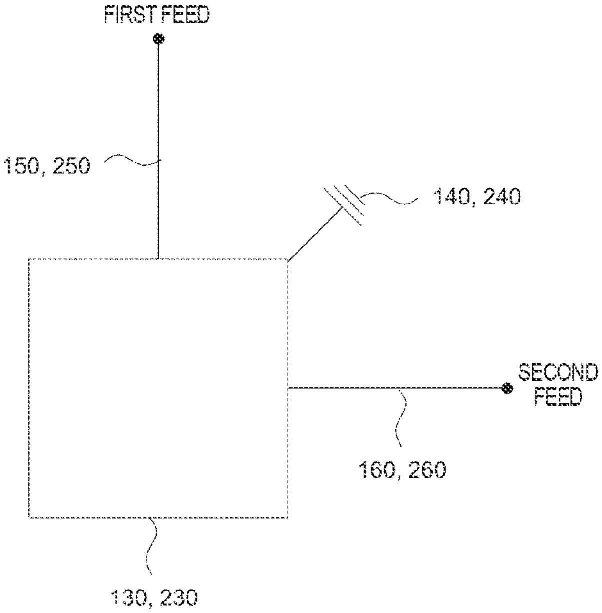

[FIG. 6]
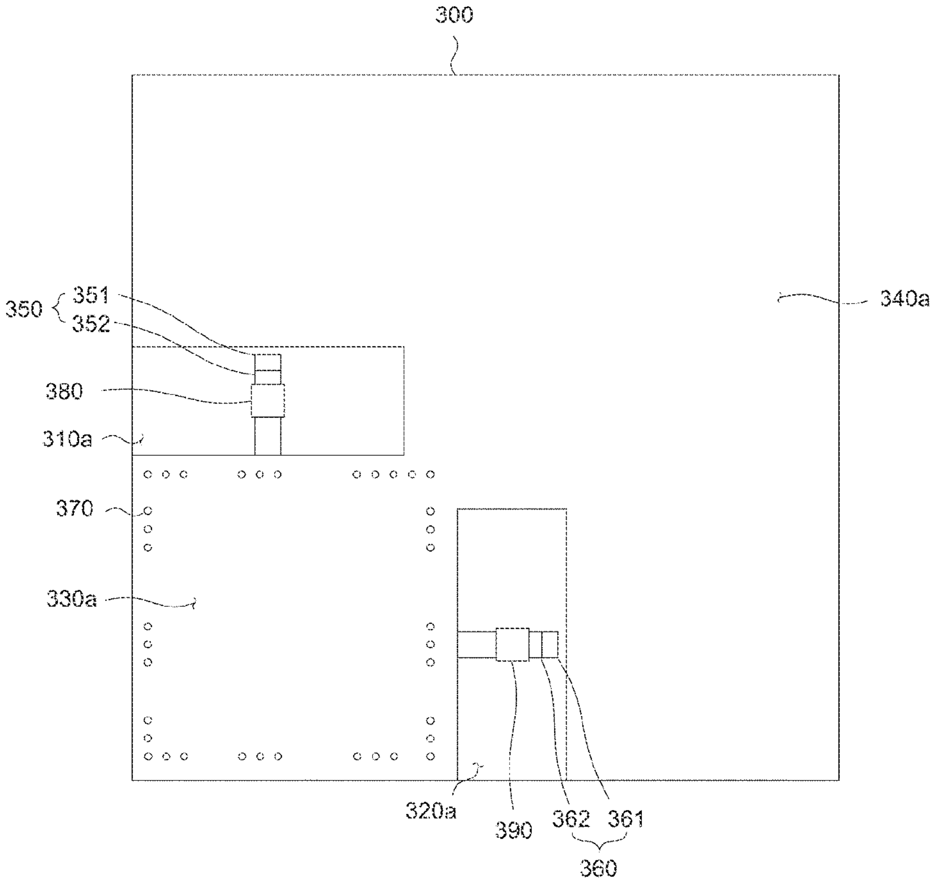

[FIG. 7]
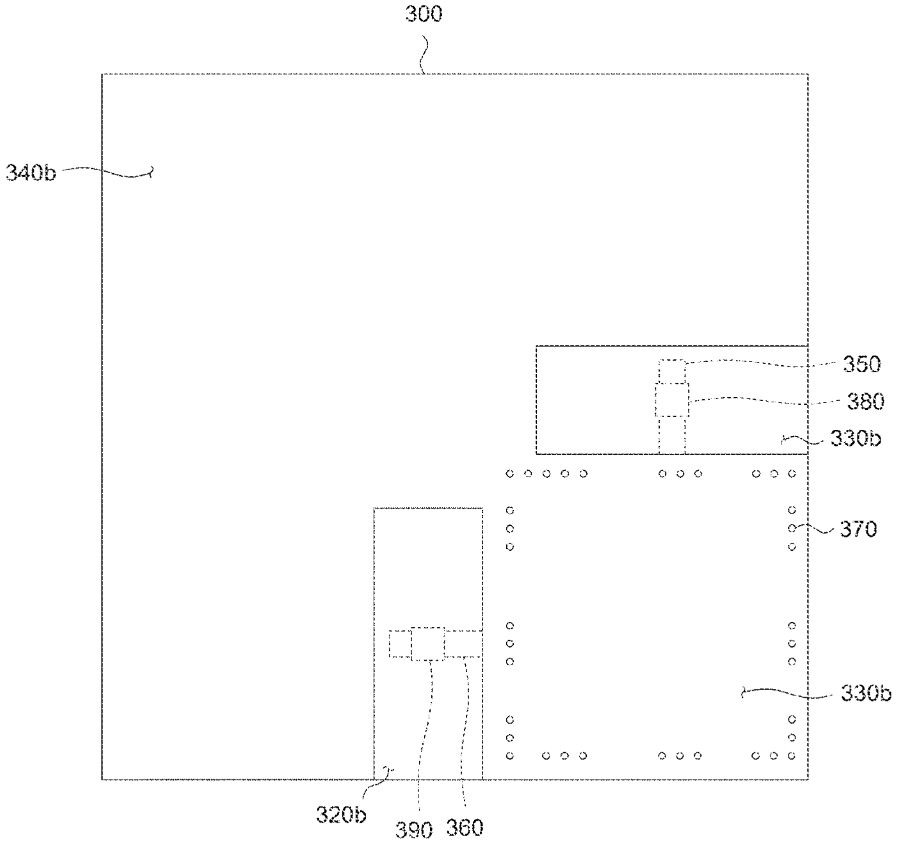

[FIG. 8]
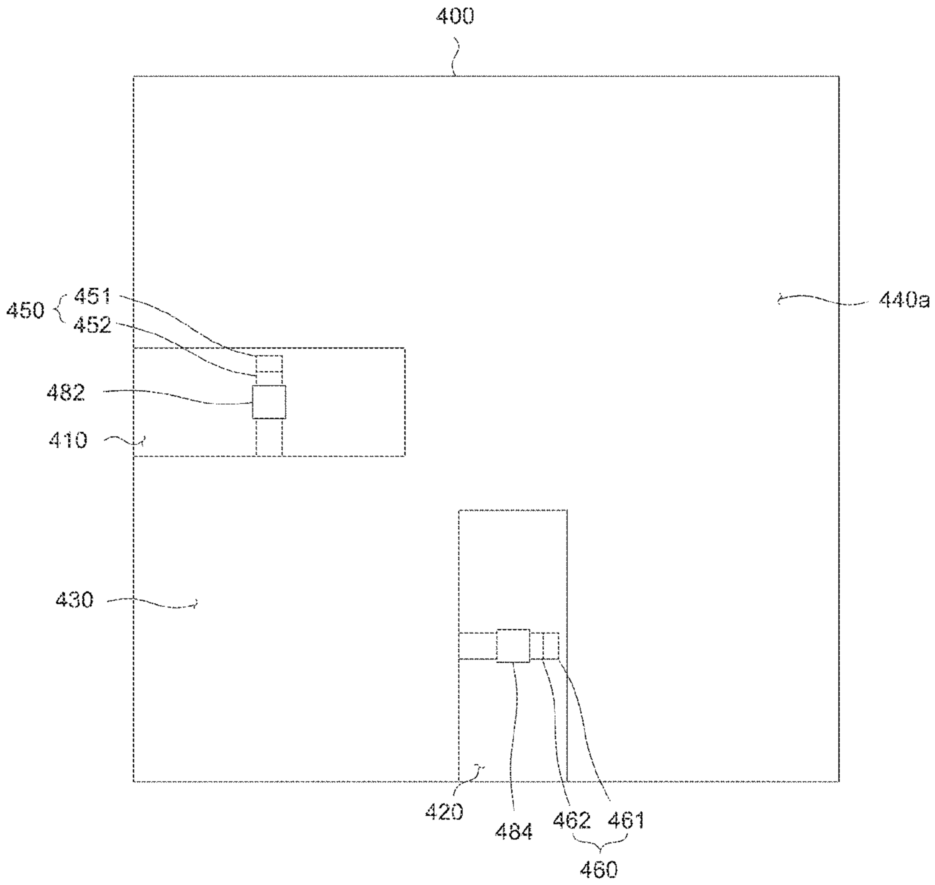

[FIG. 9]
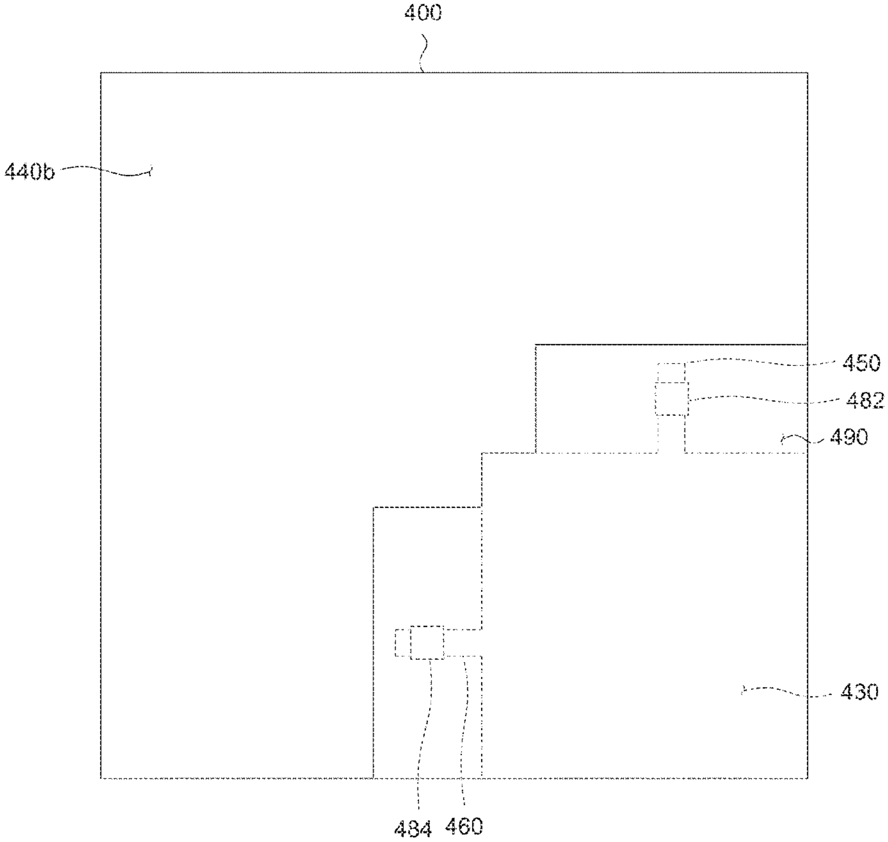

[FIG. 10]
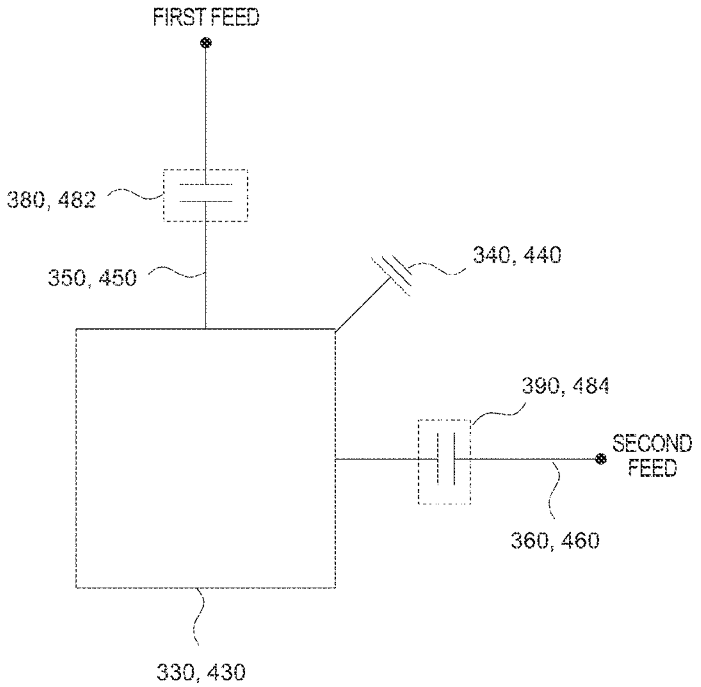

[FIG. 11]
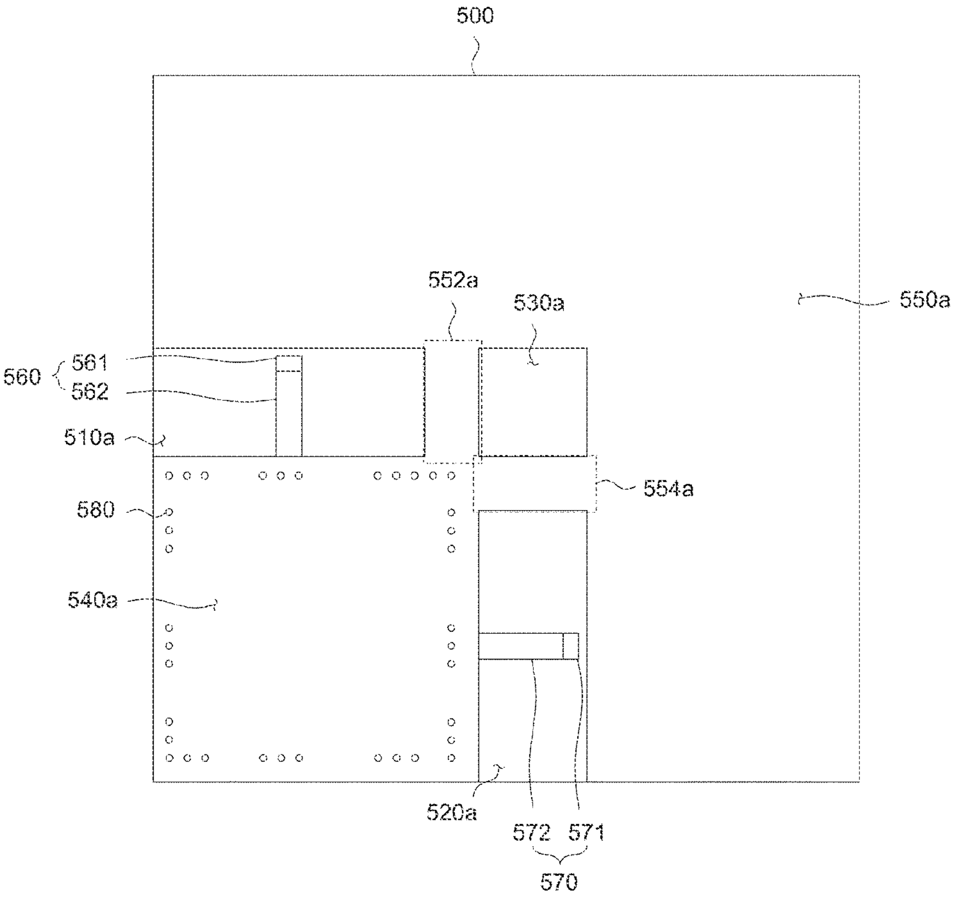

[FIG. 12]
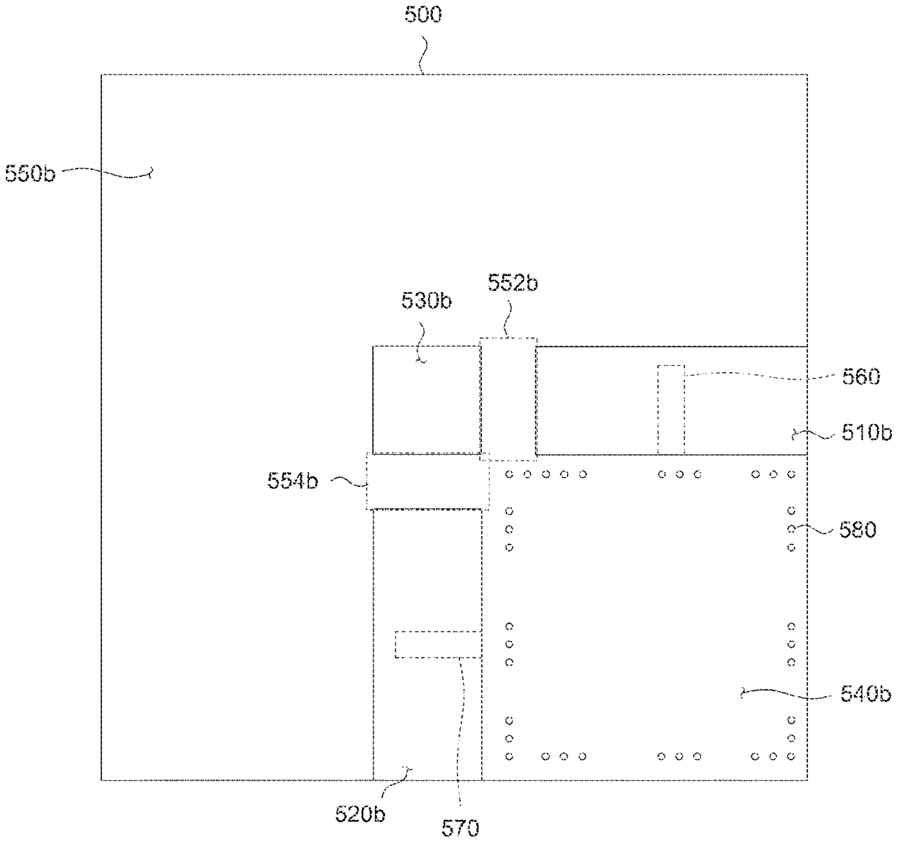

[FIG. 13]
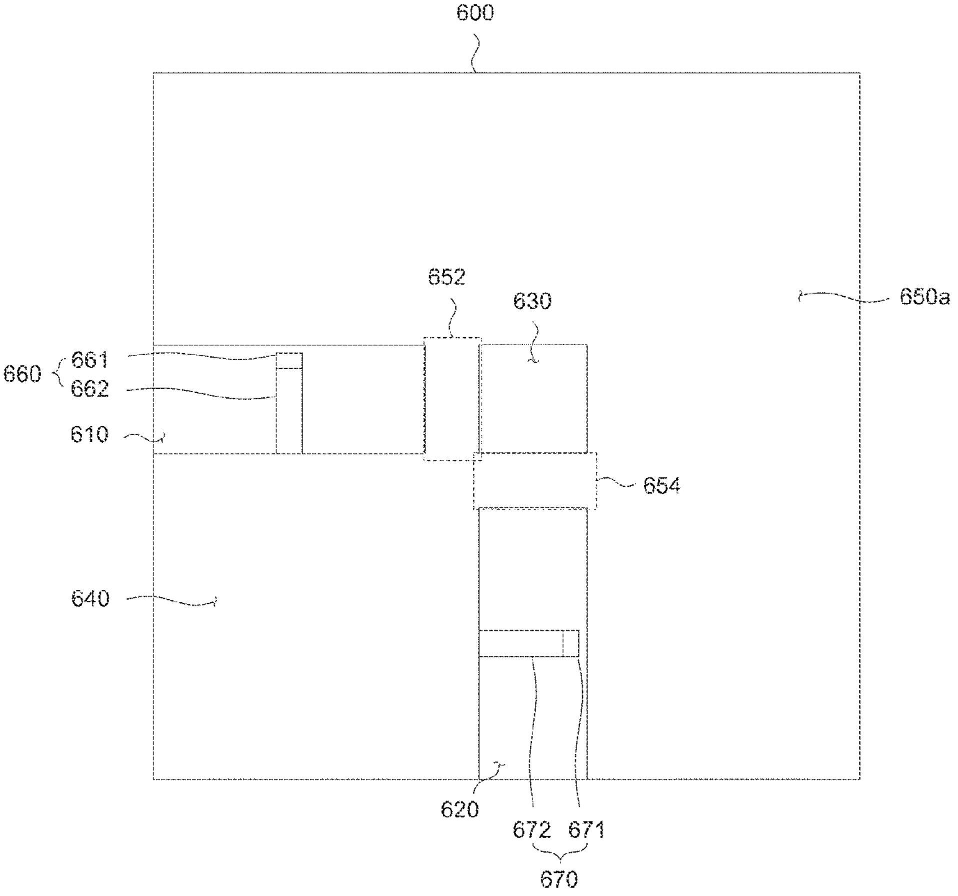

[FIG. 14]
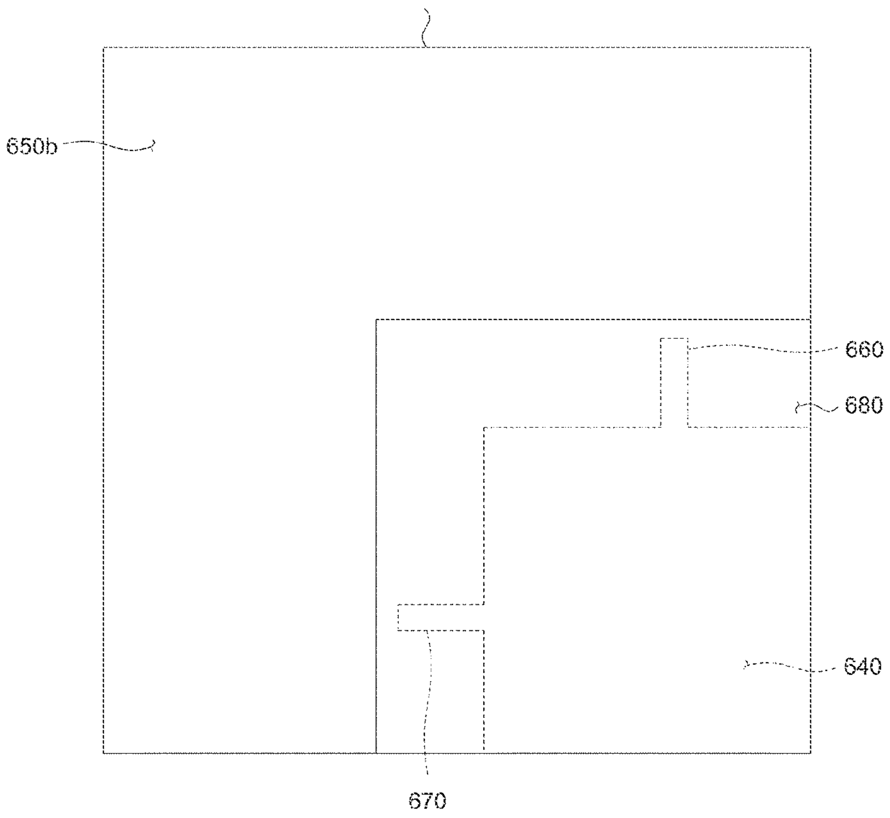

[FIG. 15]
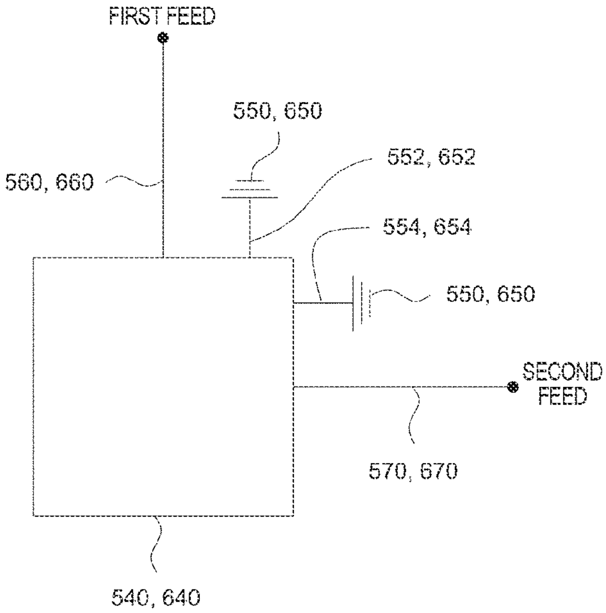

[FIG. 16]
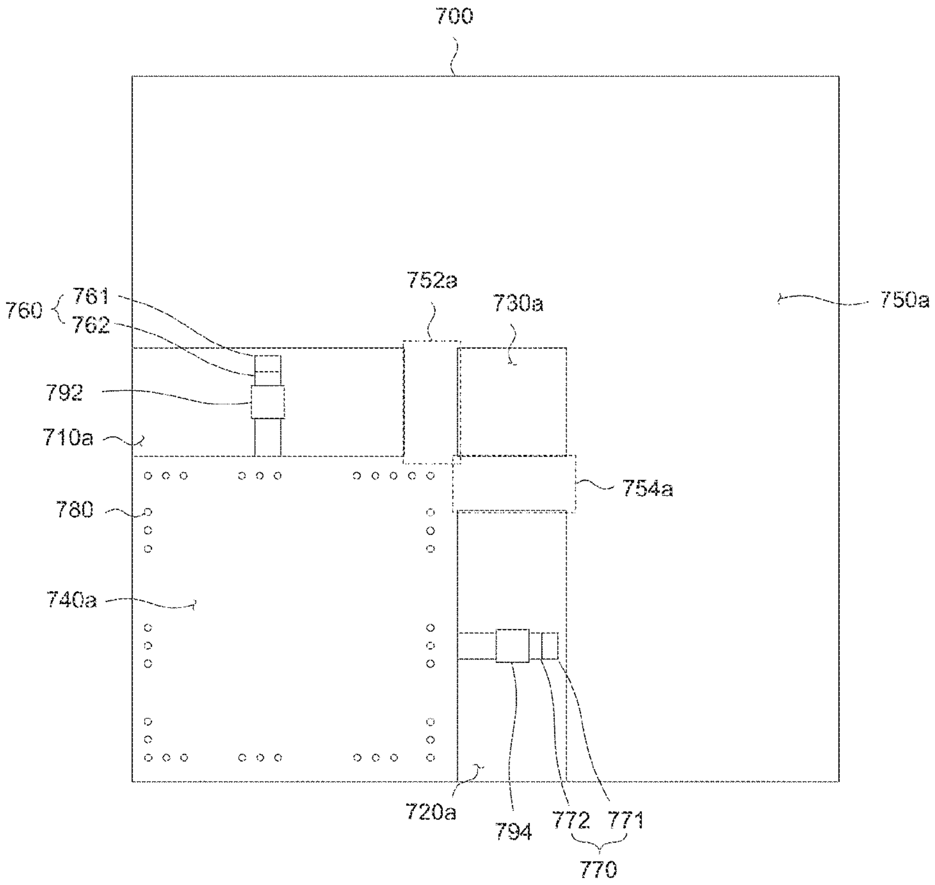

[FIG. 17]
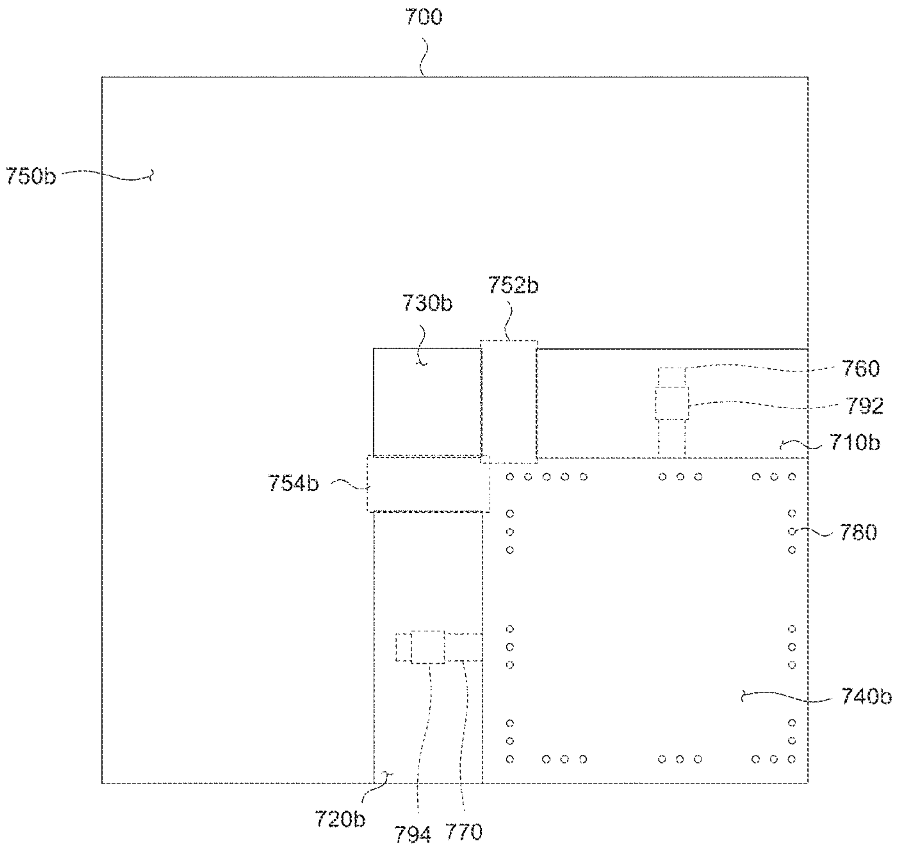

[FIG. 18]
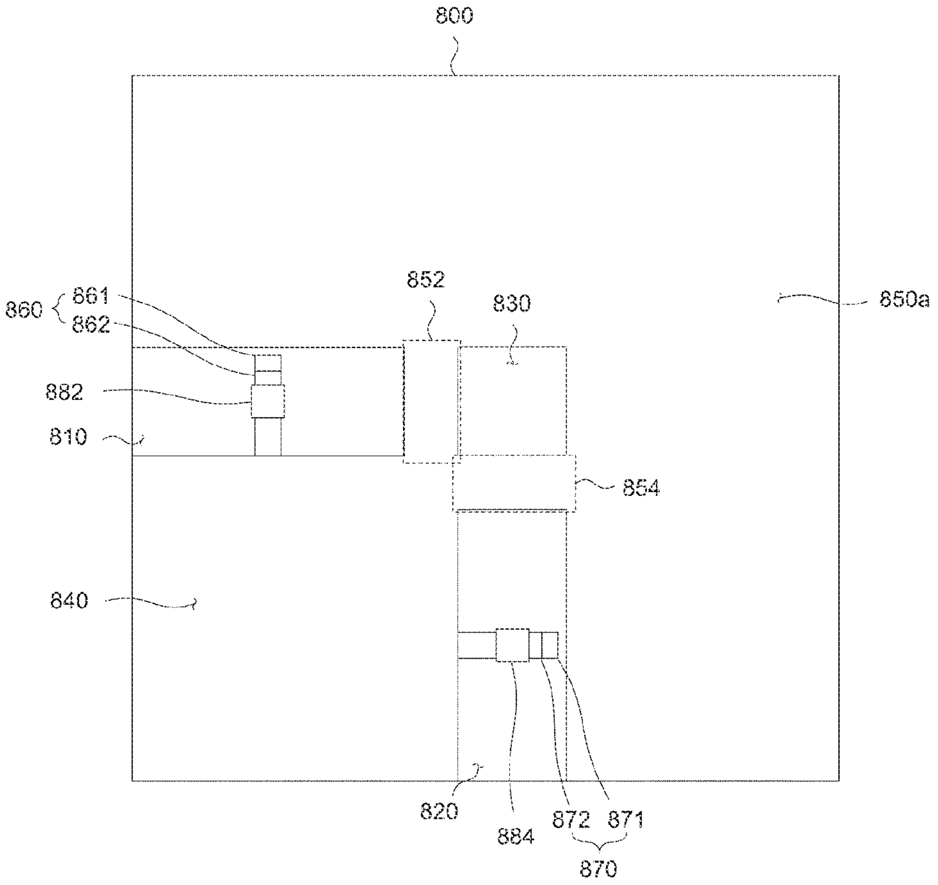

[FIG. 19]
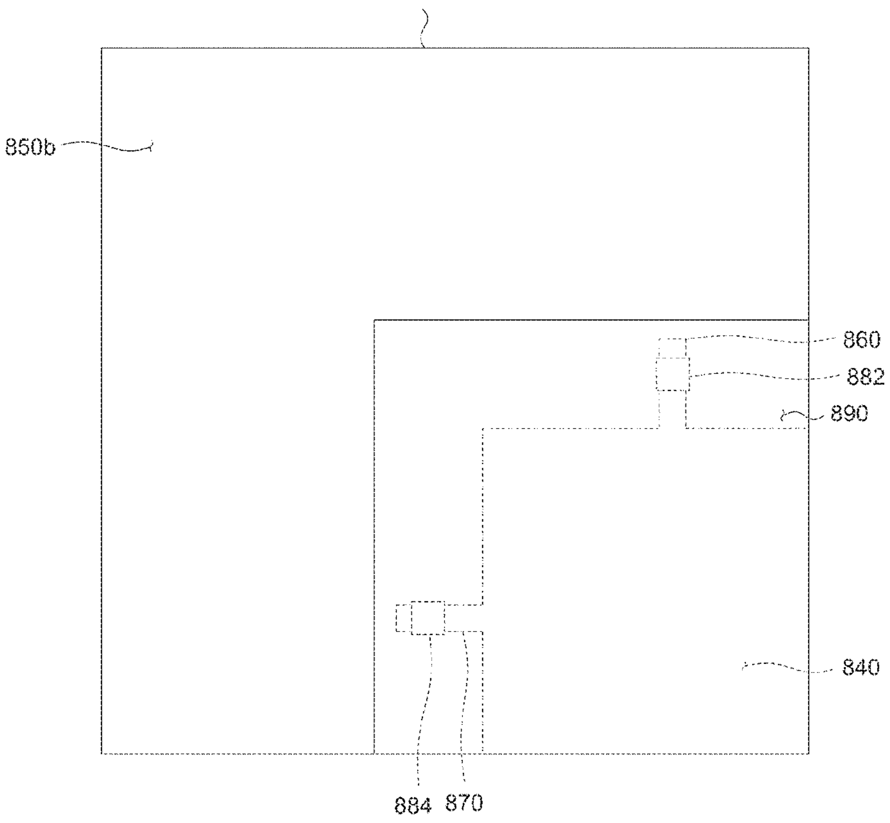

[FIG. 20]
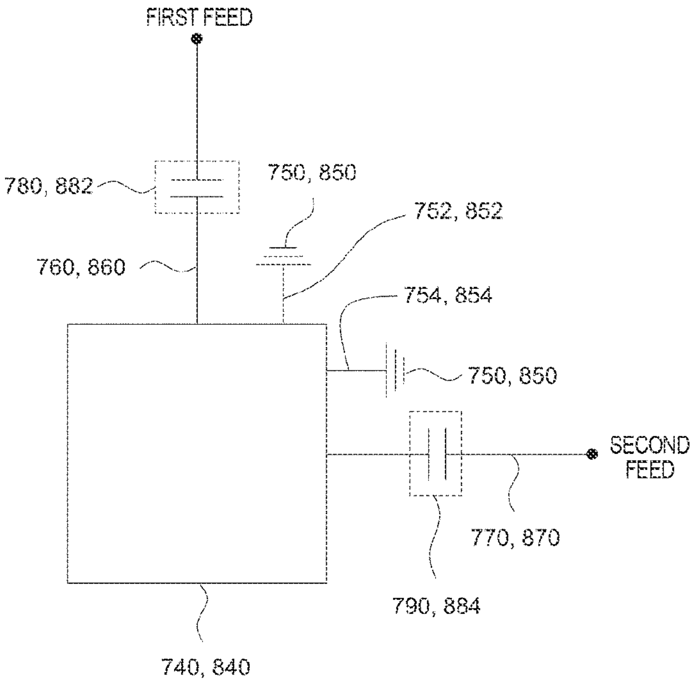

MULTI-BAND ANTENNA MODULE

TECHNICAL FIELD

The present disclosure relates to a multi-band antenna module, and more specifically, to a multi-band antenna module mounted on portable terminals, electronic devices constituting a home network, and the like.

BACKGROUND ART

As wireless communication technologies have recently developed, the wireless communication technologies are being applied to fields closely related to daily life, and a home network is an example.

For the home network, multi-band characteristics are required. Therefore, multi-band antenna modules for providing multi-band characteristics using multiple antennas are installed in electronic devices belonging to the home network.

However, in a multi-band antenna module composed of multiple antennas, interference occurs between antennas with the same polarization, and the interference between the antennas may cause the degradation of isolation, resulting in poor antenna performance.

Matters described above in the background art are intended to help understanding of the background of the disclosure and may include matters not related to the known related art.

SUMMARY OF INVENTION

Technical Problem

The present disclosure has been proposed in consideration of this point and is directed to providing a multi-band antenna module in which antennas with different polarization characteristics are coupled to prevent the degradation of isolation caused by interference between the antennas.

In addition, the present disclosure is directed to providing a multi-band antenna module for enabling stable communication by coupling antennas with different polarization characteristics to increase a transmission capacity and a transmission rate through an increase in the number of channels and preventing interference between antennas in different frequency bands.

Solution to Problem

To achieve the object, a multi-band antenna module according to an embodiment of the present disclosure includes a circuit board configured by stacking a first metal layer on an upper surface of a resin layer and stacking a second metal layer on a lower surface of the resin layer, wherein a first upper clearance area formed from a first side surface of the circuit board toward a center point of the circuit board, a second upper clearance area formed in a direction from a second side surface of the circuit board in contact with the first side surface of the circuit board to the center point of the circuit board and spaced apart from the first upper clearance area, an upper radiator surrounded by the first and second side surfaces of the circuit board, the first upper clearance area, and the second upper clearance area, an upper ground surrounded by third and fourth side surfaces of the circuit board that are opposite to the first and second side surfaces of the circuit board, the first upper clearance area, and the second upper clearance area, a first conductor area disposed in the first upper clearance area and connected to the upper radiator to feed the upper radiator, and a second conductor area disposed in the second upper clearance area and connected to the upper radiator to feed the upper radiator are defined on an upper surface of the circuit board.

In this case, the first upper clearance area and the second upper clearance area may be areas in which the first metal layer has been removed of the upper surface of the circuit board, and the upper radiator and the upper ground may be areas in which the first metal has not been removed of the upper surface of the circuit board.

Meanwhile, a third upper clearance area that is an area in which the first metal layer has been removed of the upper surface of the circuit board and disposed between the first upper clearance area and the second upper clearance area may be further defined on the upper surface of the circuit board. In this case, a first side of the third upper clearance area may be disposed to face an end portion of the first upper clearance area adjacent to the center point of the circuit board, and a second side of the third upper clearance area adjacent to the first side of the third upper clearance area may be disposed to face an end portion of the second upper clearance area adjacent to the center point of the circuit board.

A first upper connection conductor that is an area between the first upper clearance area and the third upper clearance area and connects the upper radiator with the upper ground, and a second upper connection conductor that is an area between the second upper clearance area and the third upper clearance area and connects the upper radiator with the upper ground may be further defined on the upper surface of the circuit board.

A lower clearance area that is an area in which the second metal layer has been removed of the lower surface of the circuit board and overlaps the first upper clearance area, the second upper clearance area, the third upper clearance area, and the upper radiator, and a lower ground that is an area excluding the lower clearance area of the lower surface of the circuit board and overlaps the upper ground may be defined on the lower surface of the circuit board.

The first conductor area and the second conductor area may each include a feed conductor connected to a power source; and a feed line having a first end portion connected to the feed conductor and a second end portion connected to the upper radiator. The feed conductor may be an area in which an upper surface of the first metal layer is exposed by removing a first coverlay layer among a first conductive area and a second conductive area. In this case, the circuit board may include a first matching circuit disposed in the first conductor area and a second matching circuit disposed in the second conductor area.

A first lower clearance area formed from a first side surface of the circuit board toward a center point of the circuit board to overlap the first upper clearance area, a second lower clearance area formed in a direction from a second side surface of the circuit board in contact with the first side surface of the circuit board to the center point of the circuit board to overlap the second upper clearance area and spaced apart from the first lower clearance area, a lower radiator surrounded by the first and second side surfaces of the circuit board, the first lower clearance area, and the second lower clearance area, and a lower ground surrounded by third and fourth side surfaces of the circuit board that are opposite to the first and second side surfaces of the circuit board, the first lower clearance area, and the second lower clearance area may be defined on the lower surface of the circuit board. In this case, the lower radiator may be connected to the upper radiator through one or more via holes passing through the circuit board.

Meanwhile, a third lower clearance area that is an area in which the second metal layer has been removed of the lower surface of the circuit board, disposed between the first lower clearance area and the second lower clearance area, and overlaps the third upper clearance area defined on the upper surface of the circuit board may be further defined on the lower surface of the circuit board. In this case, a first side of the third lower clearance area may be disposed to face an end portion of the first lower clearance area adjacent to the center point of the circuit board, and a second side of the third lower clearance area adjacent to the first side may be disposed to face an end portion of the second lower clearance area adjacent to the center point of the circuit board.

A first lower connection conductor that is an area between the first lower clearance area and the third lower clearance area and connects the lower radiator with the lower ground, and a second lower connection conductor that is an area between the second lower clearance area and the third lower clearance area and connects the lower radiator with the lower ground may be further defined on the lower surface of the circuit board.

The first lower clearance area and the second lower clearance area may be areas in which the second metal layer has been removed of the lower surface of the circuit board, and the lower radiator and the lower ground may be areas in which the second metal has not been removed of the lower surface of the circuit board.

A lower clearance area that is an area in which the second metal layer has been removed of the lower surface of the circuit board and overlaps the first upper clearance area, the second upper clearance area, and the upper radiator, and a lower ground that is an area excluding the lower clearance area of the lower surface of the circuit board and overlaps the upper ground may be defined on the lower surface of the circuit board.

Advantageous Effects of Invention

According to the present disclosure, the multi-band antenna module may provide the antenna for receiving the signal in the multiple bands while preventing the degradation of isolation caused by interference between the antennas by coupling the antennas with different polarization characteristics.

In addition, the multi-band antenna module can implement the multiple input multiple output (MIMO) antenna and/or the diversity antenna by forming the two feed lines that supply power to the PIFA antenna formed of the metal layer of the circuit board and constituting the two feed lines as the radiator for resonating in the frequency band that differs from that of the PIFA antenna.

In addition, the multi-band antenna module can minimize channel loss and interference by constituting the MIMO antenna and increase the communication rate by increasing the transmission capacity together with the increase in the number of channels.

In addition, the multi-band antenna module can increase the data transmission capacity and minimize the signal loss due to channel interference by constituting the diversity antenna, thereby enabling stable communication.

In addition, the multi-band antenna module can reduce the manufacturing costs and provide a relatively thin antenna compared to the structure in which the patch antenna is mounted by constituting the PIFA antenna using the metal layer of the circuit board.

BRIEF DESCRIPTION OF DRAWINGS

FIGS. 1 and 2 are views for describing a multi-band antenna module according to a first embodiment of the present disclosure.

FIGS. 3 and 4 are views for describing a multi-band antenna module according to a second embodiment of the present disclosure.

FIG. 5 is a view showing the multi-band antenna modules according to the first and second embodiments of the present disclosure.

FIGS. 6 and 7 are views for describing a multi-band antenna module according to a third embodiment of the present disclosure.

FIGS. 8 and 9 are views for describing a multi-band antenna module according to a fourth embodiment of the present disclosure.

FIG. 10 is a view showing the multi-band antenna modules according to the third and fourth embodiments of the present disclosure.

FIGS. 11 and 12 are views for describing a multi-band antenna module according to a fifth embodiment of the present disclosure.

FIGS. 13 and 14 are views for describing a multi-band antenna module according to a sixth embodiment of the present disclosure.

FIG. 15 is a view showing the multi-band antenna modules according to the fifth and sixth embodiments of the present disclosure.

FIGS. 16 and 17 are views for describing a multi-band antenna module according to a seventh embodiment of the present disclosure.

FIGS. 18 and 19 are views for describing a multi-band antenna module according to an eighth embodiment of the present disclosure.

FIG. 20 is a view showing the multi-band antenna modules according to the seventh and eighth embodiments of the present disclosure.

DESCRIPTION OF EMBODIMENTS

Hereinafter, exemplary embodiments according to the present disclosure will be described in detail with reference to the accompanying drawings.

The embodiments are provided to more completely describe the present disclosure to those skilled in the art, and the following embodiments may be modified in various different forms, and the scope of the present disclosure is limited to the following embodiments. Rather, the embodiments are provided to make the disclosure more faithful and complete and fully convey the spirit of the present disclosure.

Terms used herein are intended to describe specific embodiments and are not intended to limit the present disclosure. In addition, in the present specification, singular forms may include plural forms unless the context clearly indicates otherwise.

In the description of the embodiment, when each layer (film), area, pattern, or structure is described as being formed "on" or "under" a substrate, each layer (film), area, pad, or patterns, "on" and "under" include both cases of being formed "directly" or "indirectly with other elements interposed therebetween." In addition, in principle, the reference for "above" or "under" each layer is based on the drawing.

The drawings are only intended to help understanding of the spirit of the present disclosure and should not be construed as limiting the scope of the present disclosure by the drawings. In addition, in the drawings, a relative thickness and length, or a relative size may be exaggerated for convenience and clarity of description.

A multi-band antenna module according to an embodiment of the present disclosure operates as a multi-band antenna using two antennas with different radiation types.

In other words, the multi-band antenna module operates as a multi-band antenna by coupling a directional radiation type PIFA antenna with an omni directional radiation type monopole antenna. In this case, the PIFA antenna is formed of a metal layer of a circuit board. The monopole antenna is formed of feed lines of the PIFA antenna, and the feed line is formed of the metal layer of the circuit board.

When the multi-band antenna module is composed of antennas with similar polarization, the antennas interfere with each other, thereby degrading isolation.

Therefore, the multi-band antenna module according to the embodiment of the present disclosure minimizes the interference between the antennas by providing a composite structure that combines the directional PIFA antennas with different polarizations with the non-directional monopole antenna, thereby minimizing the degradation of isolation.

Referring to FIGS. 1 and 2, the multi-band antenna module according to the first embodiment of the present disclosure includes a circuit board 100, a first upper clearance area 110*a*, a second upper clearance area 120*a*, an upper radiator 130*a*, an upper ground 140*a*, a first conductor area 150, a second conductor area 160, a first lower clearance area 110*b*, a second lower clearance area 120*b*, a lower radiator 130*b*, a lower ground 140*b*, and a via hole 170.

The circuit board 100 is a general printed circuit board and is a stacking board in which a resin layer, a metal layer, and a coverlay layer are stacked. The circuit board 100 may be further formed with another layer made of a material, such as metal or resin, interposed between the resin layer and the metal layer. The circuit board 100 may be further formed with another layer made of a material, such as metal or resin, interposed between the metal layer and a coverlay layer.

In addition, the circuit board 100 may be a stacking board in which the metal layer is stacked on each of both surfaces of the resin layer. In this case, the metal layer may be formed by printing a metal paste on a surface of the resin layer, and in addition, the metal layer may be formed on a surface of the resin layer in any of various methods.

Hereinafter, description will be made based on an example in which the circuit board 100 includes a resin layer, a first metal layer stacked on an upper surface of the resin layer, a first coverlay layer stacked on an upper surface of the first metal layer, a second metal layer stacked on a lower surface of the resin layer, and a second coverlay layer stacked on a lower surface of the second metal layer.

A first upper clearance area 110*a* and a second upper clearance area 120*a* are defined on an upper surface of the circuit board 100.

The first upper clearance area 110*a* is an area formed by removing the first metal layer and the first coverlay layer of the circuit board 100. For example, the first upper clearance area 110*a* is formed in a rectangular shape formed in a direction from a first side surface of the circuit board 100 to a center point of the circuit board 100 and is open toward the first side surface of the circuit board 100. In this case, the first side surface is one side surface among side surfaces formed by the circuit board 100.

The second upper clearance area 120*a* is an area formed by removing the first metal layer and the first coverlay layer of the circuit board 100. For example, the second upper clearance area 120*a* is formed in a rectangular shape formed in a direction from a second side surface of the circuit board 100 to a center point of the circuit board 100 and is open toward the second side surface of the circuit board 100. In this case, the second side surface is one of the side surfaces formed by the circuit board 100 and is a side surface adjacent to the first side surface and perpendicular to the first side surface.

The upper surface of the circuit board 100 is divided into two areas through the first upper clearance area 110*a* and the second upper clearance area 120*a*. Therefore, an upper radiator 130*a* and an upper ground 140*a* are defined on the upper surface of the circuit board 100.

The upper radiator 130*a* is an area in which the first metal layer and the first coverlay layer of the circuit board 100 have not been removed and is an area surrounded by the first upper clearance area 110*a* and the second upper clearance area 120*a* of the upper surface of the circuit board 100.

For example, when the first upper clearance area 110*a* and the second upper clearance area 120*a* are formed in a rectangular shape, the upper radiator 130*a* may be defined as a rectangular area formed by a straight line extending from a first vertex at which the first and second side surfaces of the circuit board 100 are in contact with each other to the first upper clearance area 110*a* along the first side surface and a straight line extending from a second vertex to the second upper clearance area 120*a* along the second side surface.

The upper ground 140*a* is an area in which the first metal layer and the first coverlay layer of the circuit board 100 have not been removed and is an area surrounded by the first upper clearance area 110*a* and the second upper clearance area 120*a* of the upper surface of the circuit board 100.

For example, when the first upper clearance area 110*a* and the second upper clearance area 120*a* are formed in a rectangular shape, the upper ground 140*a* may be defined as a "¬"-shaped area formed by a straight line extending from the third and fourth sides surfaces and the first upper clearance area 110*a* of the circuit board 100 to a vertex in contact with the third side surface along the first side surface and a straight line extending from the second upper clearance area 120*a* to a vertex in contact with the fourth side surface along the second side surface.

The first conductor area 150 is defined in the first upper clearance area 110*a*. The first conductor area 150 is an area in which the first metal layer and/or the first coverlay layer have not been removed of the first upper clearance area 110*a*. The first conductor area 150 operates as a feed line for the PIFA antenna formed by the upper radiator 130*a* and the lower radiator 130*b* and at the same time, operates as a micro-strip line antenna.

The first conductor area 150 may be simultaneously formed together with the first upper clearance area 110*a*. In other words, the first conductor area 150 may be formed by removing the first metal layer and the first coverlay layer in an area excluding an area corresponding to the first conductor area 150 in a process of forming the first upper clearance area 110*a*. In this case, the first conductor area 150 may be spaced apart from an outer perimeter of the first upper clearance area 110*a* in the first upper clearance area 110*a* and formed in an island pattern formed to be connected to the upper radiator 130*a*.

A first feed conductor 151 and a first feed line 152 may be defined in the first conductor area 150 depending on whether the first coverlay layer is removed.

The first feed conductor 151 is an area in which the first coverlay layer has been removed of the first conductor area 150. The first feed conductor 151 is connected to a first feed unit (see FIG. 5) and the first feed line 152. In the first feed conductor 151, the first coverlay layer is removed to expose the first metal layer to an upper surface thereof, and the first feed unit is connected to the upper surface to which the first metal layer is exposed.

The first feed line 152 is an area in which the first coverlay layer has not been removed of the first conductor area 150. The first feed line 152 is connected to the first feed conductor 151 and the upper radiator 130*a*. A first end portion of the first feed line 152 is connected to the first feed conductor 151, and a second end portion of the first feed line 152 is connected to the upper radiator 130*a*.

The second conductor area 160 is defined in the second upper clearance area 120*a*. The second conductor area 160 is an area in which the first metal layer and/or the first coverlay layer have not been removed of the second upper clearance area 120*a*. The second conductor area 160 operates as a feed line for the PIFA antenna formed by the upper radiator 130*a* and the lower radiator 130*b* and at the same time, operates as a micro-strip line antenna.

The second conductor area 160 may be simultaneously formed together with the second upper clearance area 120*a*. In other words, the second conductor area 160 may be formed by removing the first metal layer and the first coverlay layer in an area excluding an area corresponding to the second conductor area 160 in a process of forming the second upper clearance area 120*a*. In this case, the second conductor area 160 may be spaced apart from an outer perimeter of the second upper clearance area 120*a* in the second upper clearance area 120*a* and formed in an island pattern formed to be connected to the upper radiator 130*a*.

A second feed conductor 161 and a second feed line 162 may be defined in the second conductor area 160 depending on whether the first coverlay layer is removed.

The second feed conductor 161 is an area in which the first coverlay layer has been removed of the second conductor area 160. The second feed conductor 161 is connected to a second feed unit (see FIG. 5) and the second feed line 162. In the second feed conductor 161, the first coverlay layer is removed to expose the first metal layer to an upper surface thereof, and the second feed unit is connected to the upper surface to which the first metal layer is exposed.

The second feed line 162 is an area in which the first coverlay layer has not been removed of the second conductor area 160. The second feed line 162 is connected to the second feed conductor 161 and the upper radiator 130*a*. A first end portion of the second feed line 162 is connected to the second feed conductor 161, and a second end portion of the second feed line 162 is connected to the upper radiator 130*a*.

The first conductor area 150 and the second conductor area 160 are defined to be orthogonal.

The first conductor area 150 is defined to be parallel to the first side surface of the circuit board 100, and the second conductor area 160 is defined to be parallel to the second side surface of the circuit board 100. Therefore, a virtual straight line passing through the first conductor area 150 in a vertical direction is perpendicular to a virtual straight line passing through the second conductor area 160 in a horizontal direction.

In other words, a first virtual straight line is defined to be parallel to the first side surface of the circuit board 100 while passing through the first feed conductor 151 and the first feed line 152 of the first conductor area 150. The second virtual straight line is defined to be parallel to the second side surface of the circuit board 100 while passing through the second feed conductor 161 and the second feed line 162 of the second conductor area 160. Therefore, the first virtual straight line and the second virtual straight line intersect so that an angle formed therebetween is 90 degrees, and the first conductor area 150 and the second conductor area 160 are defined to be orthogonal.

A first lower clearance area 110*b* and a second lower clearance area 120*b* are defined on a lower surface of the circuit board 100.

The first lower clearance area 110*b* is an area formed by removing the second metal layer and the second coverlay layer of the circuit board 100. The first lower clearance area 110*b* is defined to be disposed opposite to the first upper clearance area 110*a* with the resin layer of the circuit board 100 interposed therebetween.

For example, the first lower clearance area 110*b* is formed in a rectangular shape formed in a direction from the first side surface of the circuit board 100 to the center point of the circuit board 100 and is open toward the first side surface of the circuit board 100. In this case, the first side surface is one side surface among side surfaces formed by the circuit board 100.

The second lower clearance area 120*b* is an area formed by removing the second metal layer and the second coverlay layer of the circuit board 100. The second lower clearance area 120*b* is defined to be disposed opposite to the second upper clearance area 120*a* with the resin layer of the circuit board 100 interposed therebetween.

For example, the second lower clearance area 120*b* is formed in a rectangular shape formed in a direction from the second side surface of the circuit board 100 to the center point of the circuit board 100 and is open toward the second side surface of the circuit board 100. In this case, the second side surface is one of the side surfaces formed by the circuit board 100 and is a side surface adjacent to the first side surface and perpendicular to the first side surface.

The lower surface of the circuit board 100 is divided into two areas through the first lower clearance area 110*b* and the second lower clearance area 120*b*. Therefore, a lower radiator 130*b* and a lower ground 140*b* are defined on the lower surface of the circuit board 100.

The lower radiator 130*b* is an area in which the second metal layer and the second coverlay layer of the circuit board 100 have not been removed and is an area surrounded by the first lower clearance area 110*b* and the second lower clearance area 120*b* of the lower surface of the circuit board 100. In this case, the lower radiator 130*b* is disposed opposite to the upper radiator 130*a* with the resin layer of the circuit board 100 interposed therebetween.

For example, when the first lower clearance area 110*b* and the second lower clearance area 120*b* are formed in a rectangular shape, the lower radiator 130*b* may be defined as a rectangular area formed by a straight line extending from the first vertex at which the first and second side surfaces of the circuit board 100 are in contact with each other to the first lower clearance area 110*b* along the first side surface and a straight line extending from the second vertex to the second lower clearance area 120*b* along the second side surface.

The lower ground 140*b* is an area in which the second metal layer and the second coverlay layer of the circuit board 100 have not been removed and is an area surrounded by the first lower clearance area 110*b* and the second lower clearance area 120*b* of the lower surface of the circuit board 100. In this case, the lower ground 140*b* may be disposed opposite to the upper ground 140*a* with the resin layer of the circuit board 100 interposed therebetween and connected to the upper ground 140*a* through another via hole 170.

For example, when the first lower clearance area 110*b* and the second lower clearance area 120*b* are formed in a rectangular shape, the lower ground 140*b* may be defined as a "¬"-shaped area formed by a straight line extending from the third and fourth sides surfaces and the first lower clearance area 110*b* of the circuit board 100 to the vertex in contact with the third side surface along the first side surface and a straight line extending from the second lower clearance area 120*b* to the vertex in contact with the fourth side surface along the second side surface.

The via hole 170 connects the upper radiator 130*a* with the lower radiator 130*b* to form a PIFA antenna. In other words, the via hole 170 passes through the circuit board 100 (i.e., the upper radiator 130*a*, the resin layer of the circuit board 100, and the lower radiator 130*b*). The via hole 170 has a metal layer (not shown) formed on an inner wall thereof or is filled with a metal to connect the first metal layer of the upper radiator 130*a* with the second metal layer of the lower radiator 130*b*.

As described above, the upper radiator 130*a* and the lower radiator 130*b* are connected through a plurality of via holes 170 and connected to the upper ground 140*a* and the lower ground 140*b*. The upper radiator 130*a* and the lower radiator 130*b* operate as PIFA antennas to which power is supplied through the first conductor area 150 and the second conductor area 160 and which resonates in a first frequency band.

In addition, the first conductor area 150 and the second conductor area 160 operate as monopole antennas that resonate in a second frequency band.

Referring to FIGS. 3 and 4, the multi-band antenna module according to the second embodiment of the present disclosure includes a circuit board 200, a first upper clearance area 210, a second upper clearance area 220, a radiator 230, an upper ground 240*a*, a first conductor area 250, a second conductor area 260, a lower clearance area 270, and a lower ground 240*b*.

The circuit board 200 is a general printed circuit board and is a stacking board in which a resin layer, a metal layer, and a coverlay layer are stacked. The circuit board 200 may be further formed with another layer made of a material, such as metal or resin, interposed between the resin layer and the metal layer. The circuit board 200 may be further formed with another layer made of a material, such as metal or resin, interposed between the metal layer and a coverlay layer.

Hereinafter, description will be made based on an example in which the circuit board 200 includes a resin layer, a first metal layer stacked on an upper surface of the resin layer, a first coverlay layer stacked on an upper surface of the first metal layer, a second metal layer stacked on a lower surface of the resin layer, and a second coverlay layer stacked on a lower surface of the second metal layer.

A first upper clearance area 210 and a second upper clearance area 220 are defined on an upper surface of the circuit board 200.

The first upper clearance area 210 is an area formed by removing the first metal layer and the first coverlay layer of the circuit board 200. For example, the first upper clearance area 210 is formed in a rectangular shape formed in a direction from a first side surface of the circuit board 200 to a center point of the circuit board 200 and is open toward the first side surface of the circuit board 200. In this case, the first side surface is one side surface among side surfaces formed by the circuit board 200.

The second upper clearance area 220 is an area formed by removing the first metal layer and the first coverlay layer of the circuit board 200. For example, the second upper clearance area 220 is formed in a rectangular shape formed in a direction from a first side surface of the circuit board 200 to a center point of the circuit board 200 and is open toward the second side surface of the circuit board 200. In this case, the second side surface is one of the side surfaces formed by the circuit board 200 and is a side surface adjacent to the first side surface and perpendicular to the first side surface.

The upper surface of the circuit board 200 is divided into two areas through the first upper clearance area 210 and the second upper clearance area 220. Therefore, the radiator 230 and the upper ground 240*a* are defined on the upper surface of the circuit board 200.

The radiator 230 is an area in which the first metal layer and the first coverlay layer of the circuit board 200 have not been removed and is an area surrounded by the first upper clearance area 210 and the second upper clearance area 220 of the upper surface of the circuit board 200.

For example, when the first upper clearance area 210 and the second upper clearance area 220 are formed in a rectangular shape, the radiator 230 may be defined as a rectangular area formed by a straight line extending from a first vertex at which the first and second side surfaces of the circuit board 200 are in contact with each other to the first upper clearance area 210 along the first side surface and a straight line extending from a second vertex to the second upper clearance area 220 along the second side surface.

The radiator 230 is connected to the upper ground 240*a* and receives power through the first conductor area 250 and the second conductor area 260. Therefore, the radiator 230 operates as a PIFA antenna that resonates in the first frequency band, and the first conductor area 250 and the second conductor area 260 operate as monopole antennas that resonate in the second frequency band.

The upper ground 240*a* is an area in which the first metal layer and the first coverlay layer of the circuit board 200 have not been removed and is an area surrounded by the first upper clearance area 210 and the second upper clearance area 220 of the upper surface of the circuit board 200.

For example, when the first upper clearance area 210 and the second upper clearance area 220 are formed in a rectangular shape, the upper ground 240*a* may be defined as a "¬"-shaped area formed by a straight line extending from the third and fourth sides surfaces and the first upper clearance area 210 of the circuit board 200 to a vertex in contact with the third side surface along the first side surface and a straight line extending from the second upper clearance area 220 to a vertex in contact with the fourth side surface along the second side surface.

The first conductor area 250 is defined in the first upper clearance area 210. The first conductor area 250 is an area in which the first metal layer and/or the first coverlay layer have not been removed of the first upper clearance area 210. The first conductor area 250 operates as a feed line for the PIFA antenna formed by the radiator 230 and the lower radiator 230 and at the same time, operates as a micro-strip line antenna.

The first conductor area 250 may be simultaneously formed together with the first upper clearance area 210. In other words, the first conductor area 250 may be formed by removing the first metal layer and the first coverlay layer in an area excluding an area corresponding to the first conductor area 250 in a process of forming the first upper clearance area 210. In this case, the first conductor area 250 may be spaced apart from an outer perimeter of the first upper clearance area 210 in the first upper clearance area 210 and formed in an island pattern formed to be connected to the radiator 230.

A first feed conductor 251 and a first feed line 252 may be defined in the first conductor area 250 depending on whether the first coverlay layer is removed.

The first feed conductor 251 is an area in which the first coverlay layer has been removed of the first conductor area 250. The first feed conductor 251 is connected to a first feed unit (see FIG. 5) and the first feed line 252. In the first feed conductor 251, the first coverlay layer is removed to expose the first metal layer to an upper surface thereof, and the first feed unit is connected to the upper surface to which the first metal layer is exposed.

The first feed line 252 is an area in which the first coverlay layer has not been removed of the first conductor area 250. The first feed line 252 is connected to the first feed conductor 251 and the radiator 230. A first end portion of the first feed line 252 is connected to the first feed conductor 251, and a second end portion of the first feed line 252 is connected to the radiator 230.

The second conductor area 260 is defined in the second upper clearance area 220. The second conductor area 260 is an area in which the first metal layer and/or the first coverlay layer have not been removed of the second upper clearance area 220. The second conductor area 260 operates as a feed line for the PIFA antenna formed by the radiator 230 and the lower radiator 230 and at the same time, operates as a micro-strip line antenna.

The second conductor area 260 may be simultaneously formed together with the second upper clearance area 220. In other words, the second conductor area 260 may be formed by removing the first metal layer and the first coverlay layer in an area excluding an area corresponding to the second conductor area 260 in a process of forming the second upper clearance area 220. In this case, the second conductor area 260 may be spaced apart from an outer perimeter of the second upper clearance area 220 in the second upper clearance area 220 and formed in an island pattern formed to be connected to the radiator 230.

A second feed conductor 261 and a second feed line 262 may be defined in the second conductor area 260 depending on whether the first coverlay layer is removed.

The second feed conductor 261 is an area in which the first coverlay layer has been removed of the second conductor area 260. The second feed conductor 261 is connected to a second feed unit (see FIG. 5) and the second feed line 262. In the second feed conductor 261, the first coverlay layer is removed to expose the first metal layer to an upper surface thereof, and the second feed unit is connected to the upper surface to which the first metal layer is exposed.

The second feed line 262 is an area in which the first coverlay layer has not been removed of the second conductor area 260. The second feed line 262 is connected to the second feed conductor 261 and the radiator 230. A first end portion of the second feed line 262 is connected to the second feed conductor 261, and a second end portion of the second feed line 262 is connected to the radiator 230.

A lower clearance area 270 and a lower ground 240*b* are defined on the lower surface of the circuit board 200.

The lower clearance area 270 is an area formed by removing the second metal layer and the second coverlay layer of the circuit board 200. The lower clearance area 270 is defined opposite to the first upper clearance area 210, the second upper clearance area 220, and the radiator 230 with the resin layer of the circuit board 200 interposed therebetween.

The lower ground 240*b* is an area in which the second metal layer and the second coverlay layer have not been removed of the circuit board 200 and is an area excluding the lower clearance area 270 of the lower surface of the circuit board 200. In this case, the lower ground 240*b* is disposed opposite to the upper ground 240*a* with the resin layer of the circuit board 200 interposed therebetween. Here, the lower ground 240*b* may be connected to the upper ground 240*a* through a via hole.

Referring to FIG. 5, in the multi-band antenna modules according to the first and second embodiments of the present disclosure, the radiators 130 and 230 defined on the circuit boards 100 and 200 are connected to the first feed lines through the first conductor areas 150 and 250, connected to the second feed lines through the second conductor areas 160 and 260, and connected to the grounds 140 and 240 defined on the circuit boards 100 and 200. Therefore, the radiators 130 and 230 defined on the circuit boards 100 and 200 operate as the PIFA antennas that resonate in the first frequency band, and the first conductor areas 150 and 250 and the second conductor areas 160 and 260 operate as monopole antennas that resonate in the second frequency band.

Referring to FIGS. 6 and 7, the multi-band antenna module according to the third embodiment of the present disclosure is a modified structure of the multi-band antenna module according to the first embodiment of the present disclosure.

In this case, since the circuit board 100, the first upper clearance area 110*a*, the second upper clearance area 120*a*, the upper radiator 130*a*, the upper ground 140*a*, the first conductor area 150, the second conductor area 160, the first lower clearance area 110*b*, the second lower clearance area 120*b*, the lower radiator 130*b*, the lower ground 140*b*, and the via hole 170 are the same as the circuit board 300, the first upper clearance area 310*a*, the second upper clearance area 320*a*, the upper radiator 330*a*, the upper ground 340*a*, the first conductor area 350, the second conductor area 360, the first lower clearance area 310*b*, the second lower clearance area 320*b*, the lower radiator 330*b*, the lower ground 340*b*, and the via hole 370 of the multi-band antenna module according to the first embodiment, detailed descriptions thereof are omitted.

A first matching circuit 380 for impedance adjustment may be connected to the first conductor area 350. The first matching circuit 380 is disposed above the first conductor area 350 to generate an impedance close to 50 ohms, thereby minimizing return loss (Γ).

A second matching circuit 390 for impedance adjustment may be connected to the second conductor area 360. The second matching circuit 390 is disposed above the second conductor area 360 to generate an impedance close to 50 ohms, thereby minimizing return loss (Γ).

Referring to FIGS. 8 and 9, the multi-band antenna module according to the fourth embodiment of the present disclosure is a modified structure of the multi-band antenna module according to the second embodiment of the present disclosure.

In this case, since a circuit board 400, a first upper clearance area 410, a second upper clearance area 420, a radiator 430, an upper ground 440*a*, a first conductor area 450, a second conductor area 460, a lower clearance area 490, and a lower ground 440*b* are the same as the circuit board 200, the first upper clearance area 210, the second upper clearance area 220, the radiator 230, the upper ground 240*a*, the first conductor area 250, the second conductor area 260, the lower clearance area 270, and the lower ground 240*b* of the multi-band antenna module according to the second embodiment, detailed descriptions thereof are omitted.

A first matching circuit 482 for impedance adjustment may be connected to the first conductor area 450. The first matching circuit 482 is disposed above the first conductor area 450 to generate an impedance close to 50 ohms, thereby minimizing return loss (Γ).

A second matching circuit 484 for impedance adjustment may be connected to the second conductor area 460. The second matching circuit 484 is disposed above the second conductor area 460 to generate an impedance close to 50 ohms, thereby minimizing return loss (Γ).

Referring to FIG. 10, in the multi-band antenna modules according to the third and fourth embodiments of the present disclosure, the radiators 330 and 430 defined on the circuit boards 300 and 400 are connected to the first feed lines through the first conductor areas 350 and 450, connected to the second feed lines through the second conductor areas 360 and 460, and connected to the grounds 340 and 440 defined on the circuit boards 300 and 400.

Therefore, the radiators 330 and 430 defined on the circuit boards 300 and 400 operate as the PIFA antennas that resonate in the first frequency band, and the first conductor areas 350 and 450 and the second conductor areas 360 and 460 operate as monopole antennas that resonate in the second frequency band. In this case, the first matching circuits 380 and 482 and the second matching circuits 390 and 484 are disposed in the first conductor areas 350 and 450 and the second conductor areas 360 and 460 to minimize the return losses (Γ) of the PIFA antenna and the monopole antenna.

Referring to FIGS. 11 and 12, the multi-band antenna module according to the fifth embodiment of the present disclosure includes a circuit board 500, a first upper clearance area 510*a*, a second upper clearance area 520*a*, a third upper clearance area 530*a*, an upper radiator 540*a*, an upper ground 550*a*, a first upper connection conductor 552*a*, a second upper connection conductor 554*a*, a first conductor area 560, a second conductor area 570, a first lower clearance area 510*b*, a second lower clearance area 520*b*, a third lower clearance area 530*b*, a lower radiator 540*b*, a lower ground 550*b*, a first lower connection conductor 552*b*, a second lower connection conductor 554*b*, and a via hole 580.

The circuit board 500 is a general printed circuit board and is a stacking board in which a resin layer, a metal layer, and a coverlay layer are stacked. The circuit board 500 may be further formed with another layer made of a material, such as metal or resin, interposed between the resin layer and the metal layer. The circuit board 500 may be further formed with another layer made of a material, such as metal or resin, interposed between the metal layer and a coverlay layer.

Hereinafter, description will be made based on an example in which the circuit board 500 includes a resin layer, a first metal layer stacked on an upper surface of the resin layer, a first coverlay layer stacked on an upper surface of the first metal layer, a second metal layer stacked on a lower surface of the resin layer, and a second coverlay layer stacked on a lower surface of the second metal layer.

The first upper clearance area 510*a*, the second upper clearance area 520*a*, and the third upper clearance area 530*a* are defined on an upper surface of the circuit board 500.

The first upper clearance area 510*a* is an area formed by removing the first metal layer and the first coverlay layer of the circuit board 500. For example, the first upper clearance area 510*a* is formed in a rectangular shape formed in a direction from a first side surface of the circuit board 500 to a center point of the circuit board 500 and is open toward the first side surface of the circuit board 500. In this case, the first side surface is one side surface among side surfaces formed by the circuit board 500.

The second upper clearance area 520*a* is an area formed by removing the first metal layer and the first coverlay layer of the circuit board 500. For example, the second upper clearance area 520*a* is formed in a rectangular shape formed in a direction from a second side surface of the circuit board 500 to a center point of the circuit board 500 and is open toward the second side surface of the circuit board 500. In this case, the second side surface is one of the side surfaces formed by the circuit board 500 and is a side surface adjacent to the first side surface and perpendicular to the first side surface.

The third upper clearance area 530*a* is an area formed by removing the first metal layer and the first coverlay layer of the circuit board 500. The third upper clearance area 530*a* is defined between the first upper clearance area 510*a* and the second upper clearance area. For example, the third upper clearance area 530*a* is defined in a rectangular shape. The third upper clearance area 530*a* is defined to have adjacent two sides respectively facing one sides of the first upper clearance area 510*a* and the second upper clearance area 520*a*. In this case, the third upper clearance area 530*a* is defined to be spaced by a predetermined distance from the first upper clearance area 510*a* and the second upper clearance area 520*a*.

The upper surface of the circuit board 500 is partitioned into four areas through the first upper clearance area 510*a*, the second upper clearance area 520*a*, and the third upper clearance area 530*a*. Therefore, the upper radiator 540*a*, the upper ground 550*a*, the first upper connection conductor 552*a*, and the second upper connection conductor 554*a* are defined on the upper surface of the circuit board 500.

The upper radiator 540*a* is an area in which the first metal layer and the first coverlay layer of the circuit board 500 have not been removed and is an area surrounded by the first upper clearance area 510*a*, the second upper clearance area 520*a*, and the third upper clearance area 530*a* of the upper surface of the circuit board 500.

For example, when the first upper clearance area 510*a* and the second upper clearance area 520*a* are formed in a rectangular shape, the upper radiator 540*a* may be defined as a rectangular area formed by a straight line extending from a first vertex at which the first and second side surfaces of the circuit board 500 are in contact with each other to the first upper clearance area 510*a* along the first side surface and a straight line extending from a second vertex to the second upper clearance area 520*a* along the second side surface. In this case, a vertex with which two sides of the upper radiator 540*a* respectively facing the first and second side surfaces of the circuit board 500 are in contact corresponds to a vertex with which two sides of the third upper clearance area 530*a* facing the first upper clearance area 510*a* and the second upper clearance area 520*a* are in contact.

The upper ground 550*a* is an area in which the first metal layer and the first coverlay layer of the circuit board 500 have not been removed and is an area surrounded by the first upper clearance area 510*a*, the second upper clearance area 520*a*, and the third upper clearance area 530*a* of the upper surface of the circuit board 500. For example, the upper ground 550*a* is a "¬"-shaped area that surrounds the two sides of a quadrangle formed by the first upper clearance area 510*a*, the second upper clearance area 520*a*, and the upper radiator 540*a* of the upper surface of the circuit board 500.

The first upper connection conductor 552*a* is an area in which the first metal layer and the first coverlay layer of the circuit board 500 have not been removed. The first upper connection conductor 552*a* is defined between the first upper clearance area 510*a* and the third upper clearance area 530*a* of the upper surface of the circuit board 500 to connect the upper radiator 540*a* with the upper ground 550*a*.

The second upper connection conductor 554*a* is an area in which the first metal layer and the first coverlay layer of the circuit board 500 have not been removed. The second upper connection conductor 554*a* is defined between the second upper clearance area 520*a* and the third upper clearance area 530*a* of the upper surface of the circuit board 500 to connect the upper radiator 540*a* with the upper ground 550*a*.

The first conductor area 560 is defined in the first upper clearance area 510*a*. The first conductor area 560 is an area in which the first metal layer and/or the first coverlay layer have not been removed of the first upper clearance area 510*a*. The first conductor area 560 operates as a feed line for the PIFA antenna formed by the upper radiator 540*a* and the lower radiator 540*b* and at the same time, operates as a micro-strip line antenna.

The first conductor area 560 may be simultaneously formed together with the first upper clearance area 510*a*. In other words, the first conductor area 560 may be formed by removing the first metal layer and the first coverlay layer in an area excluding an area corresponding to the first conductor area 560 in a process of forming the first upper clearance area 510*a*. In this case, the first conductor area 560 may be spaced apart from an outer perimeter of the first upper clearance area 510*a* in the first upper clearance area 510*a* and formed in an island pattern formed to be connected to the upper radiator 540*a*.

A first feed conductor 561 and a first feed line 562 may be defined in the first conductor area 560 depending on whether the first coverlay layer is removed.

The first feed conductor 561 is an area in which the first coverlay layer has been removed of the first conductor area 560. The first feed conductor 561 is connected to a first feed unit (see FIG. 5) and the first feed line 562. In the first feed conductor 561, the first coverlay layer is removed to expose the first metal layer to an upper surface thereof, and the first feed unit is connected to the upper surface to which the first metal layer is exposed.

The first feed line 562 is an area in which the first coverlay layer has not been removed of the first conductor area 560. The first feed line 562 is connected to the first feed conductor 561 and the upper radiator 540*a*. A first end portion of the first feed line 562 is connected to the first feed conductor 561, and a second end portion of the first feed line 562 is connected to the upper radiator 540*a*.

The second conductor area 570 is defined in the second upper clearance area 520*a*. The second conductor area 570 is an area in which the first metal layer and/or the first coverlay layer have not been removed of the second upper clearance area 520*a*. The second conductor area 570 operates as a feed line for the PIFA antenna formed by the upper radiator 540*a* and the lower radiator 540*b* and at the same time, operates as a micro-strip line antenna.

The second conductor area 570 may be simultaneously formed together with the second upper clearance area 520*a*. In other words, the second conductor area 570 may be formed by removing the first metal layer and the first coverlay layer in an area excluding an area corresponding to the second conductor area 570 in a process of forming the second upper clearance area 520*a*. In this case, the second conductor area 570 may be spaced apart from an outer perimeter of the second upper clearance area 520*a* in the second upper clearance area 520*a* and formed in an island pattern formed to be connected to the upper radiator 540*a*.

A second feed conductor 571 and a second feed line 572 may be defined in the second conductor area 570 depending on whether the first coverlay layer is removed.

The second feed conductor 571 is an area in which the first coverlay layer has been removed of the second conductor area 570. The second feed conductor 571 is connected to a second feed unit (see FIG. 5) and the second feed line 572. In the second feed conductor 571, the first coverlay layer is removed to expose the first metal layer to an upper surface thereof, and the second feed unit is connected to the upper surface to which the first metal layer is exposed.

The second feed line 572 is an area in which the first coverlay layer has not been removed of the second conductor area 570. The second feed line 572 is connected to the second feed conductor 571 and the upper radiator 540*a*. A first end portion of the second feed line 572 is connected to the second feed conductor 571, and a second end portion of the second feed line 572 is connected to the upper radiator 540*a*.

The first lower clearance area 510*b*, the second lower clearance area 520*b*, and the third lower clearance area 530*b* are defined on a lower surface of the circuit board 500.

The first lower clearance area 510*b* is an area formed by removing the second metal layer and the second coverlay layer of the circuit board 500. The first lower clearance area 510*b* is defined to be disposed opposite to the first upper clearance area 510*a* with the resin layer of the circuit board 500 interposed therebetween.

For example, the first lower clearance area 510*b* is formed in a rectangular shape formed in a direction from the first side surface of the circuit board 500 to the center point of the circuit board 500 and is open toward the first side surface of the circuit board 500. In this case, the first side surface is one side surface among side surfaces formed by the circuit board 500.

The second lower clearance area 520*b* is an area formed by removing the second metal layer and the second coverlay layer of the circuit board 500. The second lower clearance area 520*b* is defined to be disposed opposite to the second upper clearance area 520*a* with the resin layer of the circuit board 500 interposed therebetween.

For example, the second lower clearance area 520*b* is formed in a rectangular shape formed in a direction from the second side surface of the circuit board 500 to the center point of the circuit board 500 and is open toward the second side surface of the circuit board 500. In this case, the second side surface is one of the side surfaces formed by the circuit board 500 and is a side surface adjacent to the first side surface and perpendicular to the first side surface.

The third lower clearance area 530*b* is an area formed by removing the second metal layer and the second coverlay layer of the circuit board 500. The third lower clearance area 530*b* is defined between the first lower clearance area 510*b* and the second lower clearance area. The third lower clearance area 530*b* is defined to be disposed opposite to the third upper clearance area 530*a* with the resin layer of the circuit board 500 interposed therebetween.

For example, the third lower clearance area 530*b* is defined in a quadrangular shape. The third lower clearance area 530*b* is defined to have adjacent two sides respectively facing one sides of the first lower clearance area 510*b* and the second lower clearance area 520*b*. In this case, the third lower clearance area 530*b* is defined to be spaced by a predetermined distance from the first lower clearance area 510*b* and the second lower clearance area 520*b*.

The lower surface of the circuit board 500 is partitioned into four areas through the first lower clearance area 510*b*, the second lower clearance area 520*b*, and the third lower clearance area 530*b*. Therefore, the lower radiator 540*b*, the lower ground 550*b*, the first lower connection conductor 552*b*, and the second lower connection conductor 554*b* are defined on the lower surface of the circuit board 500.

The lower radiator 540*b* is an area in which the second metal layer and the second coverlay layer of the circuit board 500 have not been removed and is an area surrounded by the first lower clearance area 510*b*, the second lower clearance area 520*b*, and the third lower clearance area 530*b* of the lower surface of the circuit board 500. In this case, the lower radiator 540*b* is disposed opposite to the upper radiator 540*a* with the resin layer of the circuit board 500 interposed therebetween.

The lower ground 550*b* is an area in which the second metal layer and the second coverlay layer of the circuit board 500 have not been removed and is an area surrounded by the first lower clearance area 510*b*, the second lower clearance area 520*b*, and the third lower clearance area 530*b* of the lower surface of the circuit board 500. In this case, the lower ground 550*b* may be disposed opposite to the upper ground 550*a* with the resin layer of the circuit board 500 interposed therebetween and connected to the upper ground 550*a* through another via hole 580.

The first lower connection conductor 552*b* is an area in which the first metal layer and the first coverlay layer of the circuit board 500 have not been removed. The first lower connection conductor 552*b* is defined between the first lower clearance area 510*b* and the third lower clearance area 530*b* of the lower surface of the circuit board 500 to connect the lower radiator 540*b* with the lower ground 550*b*.

The second lower connection conductor 554*b* is an area in which the second metal layer and the second coverlay layer of the circuit board 500 have not been removed. The second lower connection conductor 554*b* is defined between the second lower clearance area 520*b* and the third lower clearance area 530*b* of the lower surface of the circuit board 500 to connect the lower radiator 540*b* with the lower ground 550*b*.

The via hole 580 connects the upper radiator 540*a* with the lower radiator 540*b* to form a PIFA antenna. In other words, the via hole 580 passes through the circuit board 500 (i.e., the upper radiator 540*a*, the resin layer of the circuit board 500, and the lower radiator 540*b*). The via hole 580 has a metal layer (not shown) formed on an inner wall thereof or is filled with a metal to connect the first metal layer of the upper radiator 540*a* with the second metal layer of the lower radiator 540*b*.

As described above, the upper radiator 540*a* and the lower radiator 540*b* are connected through a plurality of via holes 580 and connected to the upper ground 550*a* and the lower ground 550*b*. The upper radiator 540*a* and the lower radiator 540*b* operate as PIFA antennas to which power is supplied through the first conductor area 560 and the second conductor area 570 and which resonates in a first frequency band.

In addition, the first conductor area 560 and the second conductor area 570 operate as monopole antennas that resonate in the second frequency band.

Referring to FIGS. 13 and 14, the multi-band antenna module according to the sixth embodiment of the present disclosure includes a circuit board 600, a first upper clearance area 610, a second upper clearance area 620, a third upper clearance area 630, a radiator 640, an upper ground 650*a*, a first upper connection conductor 652, a second upper connection conductor 654, a first conductor area 660, a second conductor area 670, a lower clearance area 680, and a lower ground 650*b*.

The circuit board 600 is a general printed circuit board and is a stacking board in which a resin layer, a metal layer, and a coverlay layer are stacked. The circuit board 600 may be further formed with another layer made of a material, such as metal or resin, interposed between the resin layer and the metal layer. The circuit board 600 may be further formed with another layer made of a material, such as metal or resin, interposed between the metal layer and a coverlay layer.

Hereinafter, description will be made based on an example in which the circuit board 600 includes a resin layer, a first metal layer stacked on an upper surface of the resin layer, a first coverlay layer stacked on an upper surface of the first metal layer, a second metal layer stacked on a lower surface of the resin layer, and a second coverlay layer stacked on a lower surface of the second metal layer.

The first upper clearance area 610, the second upper clearance area 620, and the third upper clearance area 630 are defined on an upper surface of the circuit board 600.

The first upper clearance area 610 is an area formed by removing the first metal layer and the first coverlay layer of the circuit board 600. For example, the first upper clearance area 610 is formed in a rectangular shape formed in a direction from a first side surface of the circuit board 600 to a center point of the circuit board 600 and is open toward the first side surface of the circuit board 600. In this case, the first side surface is one side surface among side surfaces formed by the circuit board 600.

The second upper clearance area 620 is an area formed by removing the first metal layer and the first coverlay layer of the circuit board 600. For example, the second upper clearance area 620 is formed in a rectangular shape formed in a direction from a first side surface of the circuit board 600 to a center point of the circuit board 600 and is open toward the second side surface of the circuit board 600. In this case, the second side surface is one of the side surfaces formed by the circuit board 600 and is a side surface adjacent to the first side surface and perpendicular to the first side surface.

The third upper clearance area 630 is an area formed by removing the first metal layer and the first coverlay layer of the circuit board 600. The third upper clearance area 630 is defined between the first upper clearance area 610 and the second upper clearance area. For example, the third upper clearance area 630 is defined in a quadrangular shape. The third upper clearance area 630 is defined to have adjacent two sides respectively facing one sides of the first upper clearance area 610 and the second upper clearance area 620. In this case, the third upper clearance area 630 is defined to be spaced by a predetermined distance from the first upper clearance area 610 and the second upper clearance area 620.

The upper surface of the circuit board 600 is partitioned into four areas through the first upper clearance area 610, the second upper clearance area 620, and the third upper clearance area 630. Therefore, the radiator 640, the upper ground 650*a*, the first upper connection conductor 652, and the second upper connection conductor 654 are defined on the upper surface of the circuit board 600.

The radiator 640 is an area in which the first metal layer and the first coverlay layer of the circuit board 600 have not been removed and is an area surrounded by the first upper clearance area 610, the second upper clearance area 620, and the third upper clearance area 630 of the upper surface of the circuit board 600.

For example, when the first upper clearance area 610 and the second upper clearance area 620 are formed in a rectangular shape, the radiator 640 may be defined as a rectangular area formed by a straight line extending from a first vertex at which the first and second side surfaces of the circuit board 600 are in contact with each other to the first upper clearance area 610 along the first side surface and a straight line extending from a second vertex to the second upper clearance area 620 along the second side surface. In this case, a vertex with which two sides of the radiator 640 respectively facing the first and second side surfaces of the circuit board 600 are in contact corresponds to a vertex with which two sides of the third upper clearance area 630 facing the first upper clearance area 610 and the second upper clearance area 620 are in contact.

The upper ground 650*a* is an area in which the first metal layer and the first coverlay layer of the circuit board 600 have not been removed and is an area surrounded by the first upper clearance area 610, the second upper clearance area 620, and the third upper clearance area 630 of the upper surface of the circuit board 600. For example, the upper ground 650*a* is a "¬"-shaped area that surrounds the two sides of a quadrangle formed by the first upper clearance area 610, the second upper clearance area 620, and the radiator 640 of the upper surface of the circuit board 600.

The first upper connection conductor 652 is an area in which the first metal layer and the first coverlay layer of the circuit board 600 have not been removed. The first upper connection conductor 652 is defined between the first upper clearance area 610 and the third upper clearance area 630 of the upper surface of the circuit board 600 to connect the radiator 640 with the upper ground 650*a*.

The second upper connection conductor 654 is an area in which the first metal layer and the first coverlay layer of the circuit board 600 have not been removed. The second upper connection conductor 654 is defined between the second upper clearance area 620 and the third upper clearance area 630 of the upper surface of the circuit board 600 to connect the radiator 640 with the upper ground 650*a*.

The first conductor area 660 is defined in the first upper clearance area 610. The first conductor area 660 is an area in which the first metal layer and/or the first coverlay layer have not been removed of the first upper clearance area 610. The first conductor area 660 operates as a feed line for the PIFA antenna formed by the radiator 640 and the lower radiator 640 and at the same time, operates as a micro-strip line antenna.

The first conductor area 660 may be simultaneously formed together with the first upper clearance area 610. In other words, the first conductor area 660 may be formed by removing the first metal layer and the first coverlay layer in an area excluding an area corresponding to the first conductor area 660 in a process of forming the first upper clearance area 610. In this case, the first conductor area 660 may be spaced apart from an outer perimeter of the first upper clearance area 610 in the first upper clearance area 610 and formed in an island pattern formed to be connected to the radiator 640.

A first feed conductor 661 and a first feed line 662 may be defined in the first conductor area 660 depending on whether the first coverlay layer is removed.

The first feed conductor 661 is an area in which the first coverlay layer has been removed of the first conductor area 660. The first feed conductor 661 is connected to a first feed unit (see FIG. 5) and the first feed line 662. In the first feed conductor 661, the first coverlay layer is removed to expose the first metal layer to an upper surface thereof, and the first feed unit is connected to the upper surface to which the first metal layer is exposed.

The first feed line 662 is an area in which the first coverlay layer has not been removed of the first conductor area 660. The first feed line 662 is connected to the first feed conductor 661 and the radiator 640. A first end portion of the first feed line 662 is connected to the first feed conductor 661, and a second end portion of the first feed line 662 is connected to the radiator 640.

The second conductor area 670 is defined in the second upper clearance area 620. The second conductor area 670 is an area in which the first metal layer and/or the first coverlay layer have not been removed of the second upper clearance area 620. The second conductor area 670 operates as a feed line for the PIFA antenna formed by the radiator 640 and the lower radiator 640 and at the same time, operates as a micro-strip line antenna.

The second conductor area 670 may be simultaneously formed together with the second upper clearance area 620. In other words, the second conductor area 670 may be formed by removing the first metal layer and the first coverlay layer in an area excluding an area corresponding to the second conductor area 670 in a process of forming the second upper clearance area 620. In this case, the second conductor area 670 may be spaced apart from an outer perimeter of the second upper clearance area 620 in the second upper clearance area 620 and formed in an island pattern formed to be connected to the radiator 640.

A second feed conductor 671 and a second feed line 672 may be defined in the second conductor area 670 depending on whether the first coverlay layer is removed.

The second feed conductor 671 is an area in which the first coverlay layer has been removed of the second conductor area 670. The second feed conductor 671 is connected to a second feed unit (see FIG. 5) and the second feed line 672. In the second feed conductor 671, the first coverlay layer is removed to expose the first metal layer to an upper surface thereof, and the second feed unit is connected to the upper surface to which the first metal layer is exposed.

The second feed line 672 is an area in which the first coverlay layer has not been removed of the second conductor area 670. The second feed line 672 is connected to the second feed conductor 671 and the radiator 640. A first end portion of the second feed line 672 is connected to the second feed conductor 671, and a second end portion of the second feed line 672 is connected to the radiator 640.

A lower clearance area 680 and a lower ground 650*b* are defined on the lower surface of the circuit board 600.

The lower clearance area 680 is an area formed by removing the second metal layer and the second coverlay layer of the circuit board 600. The lower clearance area 680 is defined to be disposed opposite to the area including the first upper clearance area 610, the second upper clearance area 620, the third upper clearance area 630, the radiator 640, the first upper connection conductor 652, and the second upper connection conductor 654 with the resin layer of the circuit board 600 interposed therebetween.

The lower ground **650*b* is an area in which the second metal layer and the second coverlay layer have not been removed of the circuit board 600 and is an area excluding the lower clearance area 680 of the lower surface of the circuit board 600. In this case, the lower ground 650*b* is disposed opposite to the upper ground 650*a* with the resin layer of the circuit board 600 interposed therebetween. Here, the lower ground 650*b* may be connected to the upper ground 650*a*** through a via hole.

Referring to FIG. 15, in the multi-band antenna modules according to the third and fourth embodiments of the present disclosure, the radiators 540 and 640 defined on the circuit boards 500 and 600 are connected to the first feed lines through the first conductor areas 560 and 660 and connected to the second feed lines through the second conductor areas 570 and 670. The radiators 540 and 640 are connected to the grounds 550 and 650 defined on the circuit boards 500 and 600 through two ground lines 552 and 650 and 554 and 654. Therefore, the radiators 540 and 640 defined on the circuit boards 500 and 600 operate as the PIFA antennas that resonate in the first frequency band, and the first conductor areas 560 and 660 and the second conductor areas 570 and 670 operate as monopole antennas that resonate in the second frequency band.

Referring to FIGS. 16 and 17, the multi-band antenna module according to the seventh embodiment of the present disclosure is a modified structure of the multi-band antenna module according to the fifth embodiment of the present disclosure.

In this case, a circuit board 700, a first upper clearance area **710*a*, a second upper clearance area 720*a*, a third upper clearance area 730*a*, an upper radiator 740*a*, an upper ground 750*a*, a first upper connection conductor 752*a*, a second upper connection conductor 754*a*, a first conductor area 760, a second conductor area 770, a first lower clearance area 710*b*, a second lower clearance area 720*b*, a third lower clearance area 730*b*, a lower radiator 740*b*, a lower ground 750*b*, a first lower connection conductor 752*b*, a third lower connection conductor 754*b*, and a via hole 780 are the same as the circuit board 500, the first upper clearance area 510*a*, the second upper clearance area 520*a*, the third upper clearance area 530*a*, the upper radiator 540*a*, the upper ground 550*a*, the first upper connection conductor 552*a*, the second upper connection conductor 554*a*, the first conductor area 560, the second conductor area 570, the first lower clearance area 510*b*, the second lower clearance area 520*b*, the third lower clearance area 530*b*, the lower radiator 540*b*, the lower ground 550*b*, the first lower connection conductor 552*b*, the second lower connection conductor 554*b*, and the via hole 580** of the multi-band antenna module according to the fifth embodiment, detailed descriptions thereof are omitted.

A first matching circuit 792 for impedance adjustment may be connected to the first conductor area 760. The first matching circuit 792 is disposed above the first conductor area 760 to generate an impedance close to 50 ohms, thereby minimizing return loss (Γ).

A second matching circuit 794 for impedance adjustment may be connected to the second conductor area 770. The second matching circuit 794 is disposed above the second conductor area 770 to generate an impedance close to 50 ohms, thereby minimizing return loss (Γ).

Referring to FIGS. 18 and 19, the multi-band antenna module according to the eighth embodiment of the present disclosure is a modified structure of the multi-band antenna module according to the sixth embodiment of the present disclosure.

In this case, since a circuit board 800, a first upper clearance area 810, a second upper clearance area 820, a third upper clearance area 830, a radiator 840, an upper ground **850*a*, a first upper connection conductor 852, a second upper connection conductor 854, a first conductor area 860, a second conductor area 870, a lower clearance area 890, and a lower ground 850*b* are the same as the circuit board 600, the first upper clearance area 610, the second upper clearance area 620, the third upper clearance area 630, the radiator 640, the upper ground 650*a*, the first upper connection conductor 652, the second upper connection conductor 654, the first conductor area 660, the second conductor area 670, the lower clearance area 680, and the lower ground 650*b*** of the multi-band antenna module according to the sixth embodiment, detailed descriptions thereof are omitted.

A first matching circuit 882 for impedance adjustment may be connected to the first conductor area 810. The first matching circuit 882 is disposed above the first conductor area 810 to generate an impedance close to 50 ohms, thereby minimizing return loss (Γ).

A second matching circuit 884 for impedance adjustment may be connected to the second conductor area 820. The second matching circuit 884 is disposed above the second conductor area 820 to generate an impedance close to 50 ohms, thereby minimizing return loss (Γ).

Referring to FIG. 20, in the multi-band antenna modules according to the seventh and eighth embodiments of the present disclosure, the radiators 740 and 840 defined on the circuit boards 700 and 800 are connected to the first feed lines through the first conductor areas 760 and 860, connected to the second feed lines through the second conductor areas 770 and 870, and connected to the grounds 750 and 850 defined on the circuit boards 700 and 800 through two ground lines 752 and 754 and 852 and 854. Therefore, the radiators 740 and 840 defined on the circuit boards 700 and 800 operate as the PIFA antennas that resonate in the first frequency band, and the first conductor areas 760 and 860 and the second conductor areas 770 and 870 operate as monopole antennas that resonate in the second frequency band. In this case, the first matching circuits 780 and 882 and the second matching circuits 790 and 884 are respectively disposed in the first conductor areas 760 and 860 and the second conductor areas 770 and 870 to minimize the return losses (Γ) of the PIFA antenna and the monopole antenna.

The above description is merely the exemplary description of the technical spirit of the present disclosure, and those skilled in the art to which the present disclosure pertains will be able to variously modify and change the present disclosure without departing from the essential characteristics of the present disclosure. Therefore, the embodiments disclosed in the present disclosure are not intended to limit the technical spirit of the present disclosure, but intended to describe the same, and the scope of the technical spirit of the present disclosure is not limited by these embodiments. The scope of the present disclosure should be construed according to the appended claims, and all technical spirits within the equivalent range should be construed as being included in the scope of the present disclosure.

The invention claimed is:

1. A multi-band antenna module comprising:

a circuit board configured by stacking a first metal layer on an upper surface of a resin layer and stacking a second metal layer on a lower surface of the resin layer, wherein a first upper clearance area formed in a direction from a first side surface of the circuit board toward a center point of the circuit board, a second upper clearance area formed in a direction from a second side surface of the circuit board in contact with the first side surface of the circuit board to the center point of the circuit board and spaced apart from the first upper clearance area, an upper radiator surrounded by the first and second side surfaces of the circuit board, the first upper clearance area, and the second upper clearance area, an upper ground surrounded by third and fourth side surfaces of the circuit board that are opposite to the first and second side surfaces of the circuit board, the first upper clearance area, and the second upper clearance area, a first conductor area disposed in the first upper clearance area and connected to the upper radiator to feed the upper radiator, and a second conductor area disposed in the second upper clearance area and connected to the upper radiator to feed the upper radiator are defined on an upper surface of the circuit board.

2. The multi-band antenna module of claim 1, wherein the first upper clearance area and the second upper clearance area are areas in which the first metal layer has been removed of the upper surface of the circuit board, and the upper radiator and the upper ground are areas in which the first metal layer has not been removed of the upper surface of the circuit board.

3. The multi-band antenna module of claim 1, wherein a third upper clearance area that is an area in which the first metal layer has been removed of the upper surface of the circuit board and disposed between the first upper clearance area and the second upper clearance area is further defined on the upper surface of the circuit board.

4. The multi-band antenna module of claim 3, wherein a first side of the third upper clearance area is disposed to face an end portion of the first upper clearance area adjacent to the center point of the circuit board, and a second side of the third upper clearance area adjacent to the first side of the third upper clearance area is disposed to face an end portion of the second upper clearance area adjacent to the center point of the circuit board.

5. The multi-band antenna module of claim 3, wherein a first upper connection conductor that is an area between the first upper clearance area and the third upper clearance area and connects the upper radiator with the upper ground, and a second upper connection conductor that is an area between the second upper clearance area and the third upper clearance area and connects the upper radiator with the upper ground are further defined on the upper surface of the circuit board.

6. The multi-band antenna module of claim 3, wherein a lower clearance area that is an area in which the second metal layer has been removed of the lower surface of the circuit board and overlaps the first upper clearance area, the second upper clearance area, the third upper clearance area, and the upper radiator, and a lower ground that is an area excluding the lower clearance area of the lower surface of the circuit board and overlaps the upper ground are defined on the lower surface of the circuit board.

7. The multi-band antenna module of claim 1, wherein the first conductor area and the second conductor area each include:

a feed conductor connected to a power source; and a feed line having a first end portion connected to the feed conductor and a second end portion connected to the upper radiator.

8. The multi-band antenna module of claim 7, wherein a first virtual straight line parallel to the first side surface of the circuit board while passing through the feed conductor and the feed line of the first conductor area is orthogonal to a second virtual straight line parallel to the second side surface of the circuit board while passing through the feed conductor and the feed line of the second conductor area.

9. The multi-band antenna module of claim 1, wherein the circuit board includes:

a first matching circuit disposed in the first conductor area; and a second matching circuit disposed in the second conductor area.

10. The multi-band antenna module of claim 1, wherein a first lower clearance area formed in a direction from a first side surface of the circuit board toward a center point of the circuit board to overlap the first upper clearance area, a second lower clearance area formed in a direction from a second side surface of the circuit board in contact with the first side surface of the circuit board to the center point of the circuit board to overlap the second upper clearance area and spaced apart from the first lower clearance area, a lower radiator surrounded by the first and second side surfaces of the circuit board, the first lower clearance area, and the second lower clearance area, and a lower ground surrounded by third and fourth side surfaces of the circuit board that are opposite to the first and second side surfaces of the circuit board, the first lower clearance area, and the second lower clearance area are defined on the lower surface of the circuit board.

11. The multi-band antenna module of claim 10, wherein the lower radiator is connected to the upper radiator through one or more via holes passing through the circuit board.

12. The multi-band antenna module of claim 10, wherein a third lower clearance area that is an area in which the second metal layer has been removed of the lower surface of the circuit board, disposed between the first lower clearance area and the second lower clearance area, and overlaps the third upper clearance area defined on the upper surface of the circuit board is further defined on the lower surface of the circuit board.

13. The multi-band antenna module of claim 12, wherein a first side of the third lower clearance area is disposed to face an end portion of the first lower clearance area adjacent to the center point of the circuit board, and a second side of the third lower clearance area adjacent to the first side is disposed to face an end portion of the second lower clearance area adjacent to the center point of the circuit board.

14. The multi-band antenna module of claim 12, wherein a first lower connection conductor that is an area between the first lower clearance area and the third lower clearance area and connects the lower radiator with the lower ground, and a second lower connection conductor that is an area between the second lower clearance area and the third lower clearance area and connects the lower radiator with the lower ground are further defined on the lower surface of the circuit board.

15. The multi-band antenna module of claim 10, wherein the first lower clearance area and the second lower clearance area are areas in which the second metal layer has been removed of the lower surface of the circuit board, and the lower radiator and the lower ground are areas in which the second metal has not been removed of the lower surface of the circuit board.

16. The multi-band antenna module of claim 1, wherein a lower clearance area that is an area in which the second metal layer has been removed of the lower surface of the circuit board and overlaps the first upper clearance area, the second upper clearance area, and the upper radiator, and a lower ground that is an area excluding the lower clearance area of the lower surface of the circuit board and overlaps the upper ground are defined on the lower surface of the circuit board.

17. The multi-band antenna module of claim 1, wherein the first side surface of the circuit board is orthogonal to the second side surface of the circuit board, and the first conductor area is parallel to the first side surface of the circuit board, and the second conductor area is parallel to the second side surface of the circuit board.

* * * * *